United States Patent
Kajiya et al.

(10) Patent No.: US 9,709,706 B2
(45) Date of Patent: Jul. 18, 2017

(54) OPTICAL UNIT, IMAGING DEVICE, ELECTRONIC APPARATUS, AND MASTER

(71) Applicant: Sony Corporation, Tokyo (JP)

(72) Inventors: Shunichi Kajiya, Kanagawa (JP); Hiroshi Tazawa, Kanagawa (JP); Rie Tsubo, Kanagawa (JP); Kazuya Hayashibe, Kanagawa (JP); Hiroshi Tanaka, Kanagawa (JP); Toru Yatabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 14/186,097

(22) Filed: Feb. 21, 2014

(65) Prior Publication Data

US 2014/0247496 A1    Sep. 4, 2014

(30) Foreign Application Priority Data

Mar. 1, 2013   (JP) ................................. 2013-041074

(51) Int. Cl.
  *G02B 1/11*   (2015.01)
  *G02B 1/118*  (2015.01)
(52) U.S. Cl.
  CPC .................... *G02B 1/118* (2013.01)
(58) Field of Classification Search
  CPC ..................... G02B 1/118; G02B 5/02–5/0294
  USPC ................... 359/577–590, 599, 615
  See application file for complete search history.

(56) References Cited

U.S. PATENT DOCUMENTS

| | | | | |
|---|---|---|---|---|
| 7,711,223 B2 * | 5/2010 | Chao | .................... | G02B 6/0016 359/599 |
| 2005/0074579 A1 * | 4/2005 | Suzuki | .................... | B29C 59/02 428/141 |
| 2007/0118939 A1 * | 5/2007 | Repetto | .................... | C25D 11/12 438/706 |
| 2008/0304155 A1 * | 12/2008 | Endoh | .................... | G02B 1/118 359/558 |
| 2011/0102900 A1 * | 5/2011 | Hayashibe | .................... | G02B 1/118 359/601 |
| 2011/0235181 A1 * | 9/2011 | Hayashibe | .................... | G02B 1/118 359/577 |
| 2012/0026591 A1 * | 2/2012 | Hayashibe | .................... | B82Y 20/00 359/601 |
| 2013/0242398 A1 * | 9/2013 | Taguchi | .................... | G02B 1/118 359/601 |

FOREIGN PATENT DOCUMENTS

JP           4404161        11/2009

* cited by examiner

*Primary Examiner* — Bumsuk Won
*Assistant Examiner* — Jeffrey Madonna
(74) *Attorney, Agent, or Firm* — Chip Law Group

(57) ABSTRACT

An optical unit having an antireflection function includes a wave surface having a wavelength equal to or shorter than a wavelength of visible light. The wave surface has a curved plane which curves in a recessed shape between an apex portion and a bottom portion of the wave surface. An inflection point of an area of a cross section obtained by cutting through the wave surface in a plane perpendicular to a direction of vibration of the wave surface is positioned toward the bottom portion of the wave surface from a center of the vibration.

14 Claims, 23 Drawing Sheets

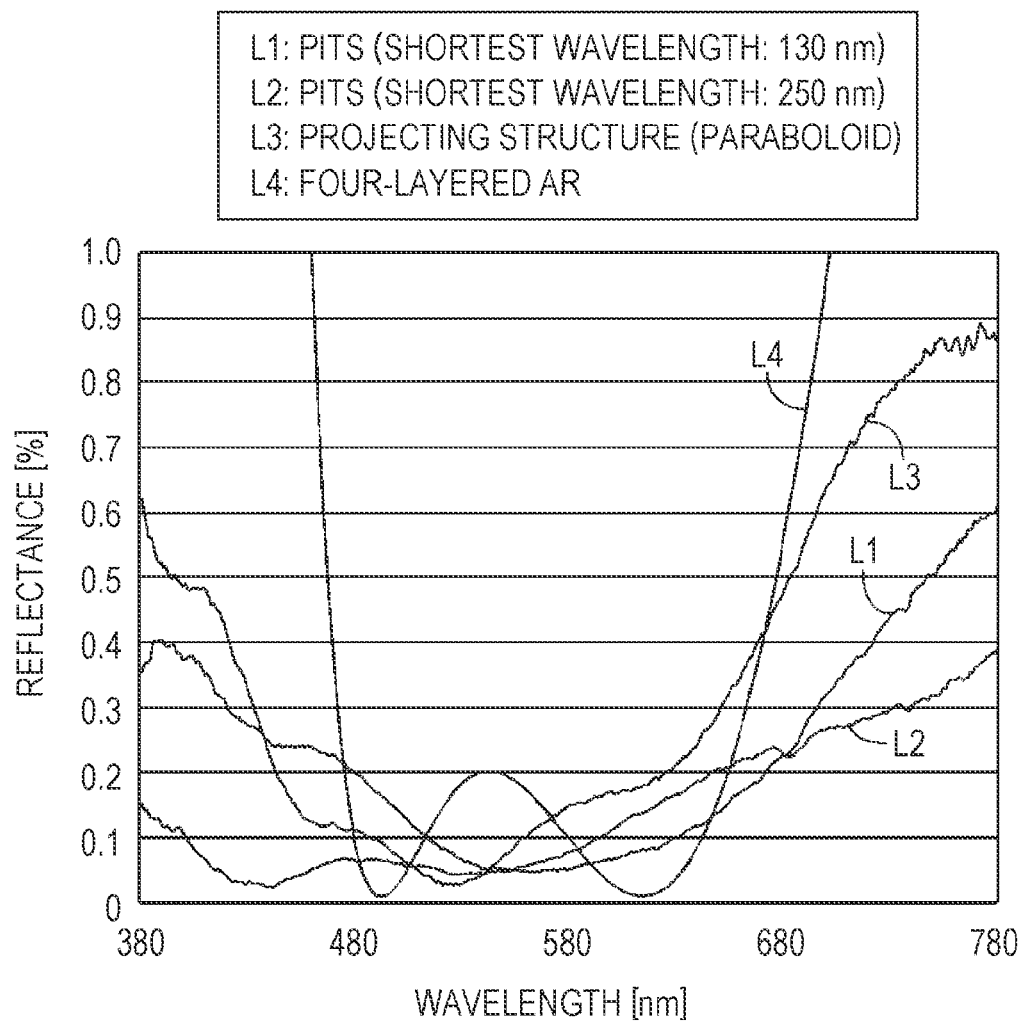

OPTICAL UNIT, IMAGING DEVICE, ELECTRONIC APPARATUS, AND MASTER

CROSS REFERENCE TO RELATED APPLICATIONS

This application claims the benefit of Japanese Priority Patent Application JP 2013-041074 filed Mar. 1, 2013, the entire contents of which are incorporated herein by reference.

BACKGROUND

The present technology relates to an optical unit, an imaging device, an electronic apparatus, and a master, and more particularly, to an optical unit having an antireflection function.

An example of antireflection techniques of the related art is a technique for suppressing surface reflection by forming a multilayered coating film or a nanostructure on a surface. Among such techniques, a technique for forming a nanostructure on a surface is particularly attracting people's attention since an antireflection effect can be exhibited for a relatively wide wavelength range.

Japanese Patent No. 4404161 discloses a technique for suppressing surface reflection by forming a wave surface on the surface of a base member by two-dimensionally arranging a plurality of nanostructures on the surface of the base member. As the nanostructures, nanostructures having a projecting shape with respect to the surface of the base member (for example, see FIG. 2) and nanostructures having a recessed shape (pits) with respect to the surface of the base member (for example, see FIG. 18) are disclosed.

Hitherto, concerning nanostructures having a projecting shape with respect to the surface of a base member, a study has been extensively conducted on the shapes of projections that may improve antireflection characteristics. However, it is also desirable to improve antireflection characteristics for nanostructures having a recessed shape (pits) with respect to the surface of a base member. Particularly, among wave surfaces constituted by such nanostructures having a recessed shape, it is desirable to improve antireflection characteristics for a wave surface having a curved plane which curves in a recessed shape between an apex and a bottom of the wave surface.

SUMMARY

It is thus desirable to provide an optical unit, an imaging device, an electronic apparatus, and a master in which it is possible to improve antireflection characteristics even if a wave surface having a wavelength equal to or shorter than that of visible light has a curved plane which curves in a recessed shape between an apex and a bottom of the wave surface.

According to an embodiment of the present technology, there is provided an optical unit having an antireflection function. The optical unit includes a wave surface having a wavelength equal to or shorter than a wavelength of visible light, the wave surface having a curved plane which curves in a recessed shape between an apex portion and a bottom portion of the wave surface. An inflection point of an area of a cross section obtained by cutting through the wave surface in a plane perpendicular to a direction of vibration of the wave surface is positioned toward the bottom portion of the wave surface from a center of the vibration.

According to an embodiment of the present technology, there is provided a mask including a wave surface having a wavelength equal to or shorter than a wavelength of visible light, the wave surface having a curved plane which curves in a projecting shape between an apex portion and a bottom portion of the wave surface. An inflection point of an area of a cross section obtained by cutting through the wave surface in a plane perpendicular to a direction of vibration of the wave surface is positioned toward the apex portion of the wave surface from a center of the vibration.

According to an embodiment of the present technology, there is provided an imaging device including an optical system which includes an optical unit having an antireflection function. The optical unit includes a wave surface having a wavelength equal to or shorter than a wavelength of visible light, the wave surface having a curved plane which curves in a recessed shape between an apex portion and a bottom portion of the wave surface. An inflection point of an area of a cross section obtained by cutting through the wave surface in a plane perpendicular to a direction of vibration of the wave surface is positioned toward the bottom portion of the wave surface from a center of the vibration.

According to an embodiment of the present technology, there is provided an electronic apparatus including a display device which includes an optical unit having an antireflection function. The optical unit includes a wave surface having a wavelength equal to or shorter than a wavelength of visible light, the wave surface having a curved plane which curves in a recessed shape between an apex portion and a bottom portion of the wave surface. An inflection point of an area of a cross section obtained by cutting through the wave surface in a plane perpendicular to a direction of vibration of the wave surface is positioned toward the bottom portion of the wave surface from a center of the vibration.

According to an embodiment of the optical unit, the imaging device, and the electronic apparatus, the optical unit includes a wave surface having a wavelength equal to or shorter than that of visible light, and the inflection point of an area S of a cross section obtained by cutting through the wave surface in a plane perpendicular to the direction of vibration of the wave surface is positioned toward the bottom portion of the wave surface from the center of the vibration. Thus, it is possible to improve antireflection characteristics even if the wave surface has a curved plane which curves in a recessed shape between the apex portion and the bottom portion of the wave surface.

According to an embodiment of the mask, the mask includes a wave surface having a wavelength equal to or shorter than that of visible light, and the inflection point of an area S of a cross section obtained by cutting through the wave surface in a plane perpendicular to the direction of vibration of the wave surface is positioned toward the apex portion of the wave surface from the center of the vibration. Thus, it is possible to form, by the transfer of the shape of the mask, a wave surface in which the inflection point of an area S of a cross section obtained by cutting through the wave surface in a plane perpendicular to the direction of vibration of the wave surface is positioned toward the bottom portion of the wave surface from the center of the vibration.

BRIEF DESCRIPTION OF THE DRAWINGS

FIG. 23 illustrates reflection spectra of each of optical sheets of Examples 1-1, 1-2, and Comparative Examples 3 and 4.

DETAILED DESCRIPTION OF EMBODIMENTS

Overview

Figure 1A:
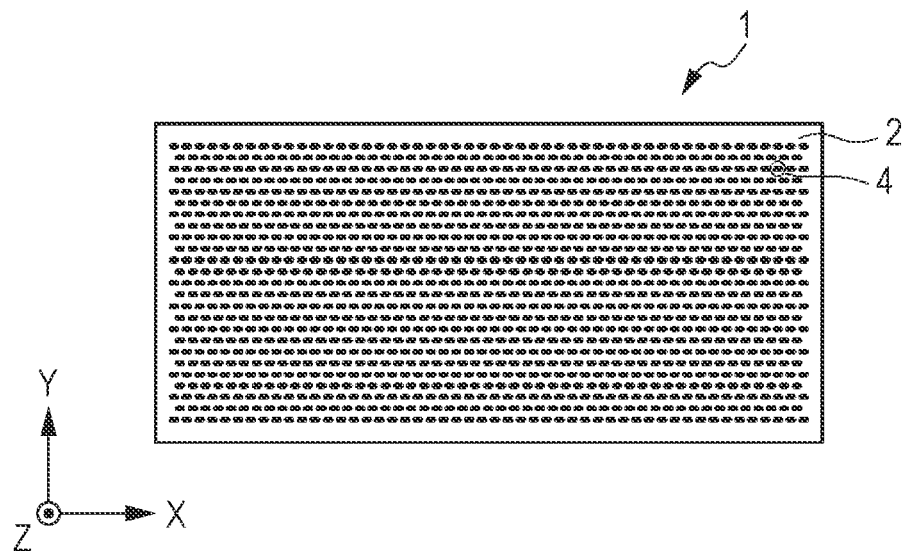
FIG. 1A is a plan view illustrating an example of the configuration of an optical unit according to a first embodiment of the present technology.

After being committed to an intensive study to improve antireflection characteristics, the present inventors have found that it is more difficult to suppress an increase in the reflectance with respect to a wide wavelength range (for example, the entire visible light range) when a wave surface has a curved plane which curves in a recessed shape between an apex and a bottom of the wave surface than when a wave surface has a curved plane which curves in a projecting shape between an apex and a bottom of the wave surface, and as a result, antireflection characteristics are decreased when a wave surface includes a curved plane which curves in a recessed shape between an apex and a bottom of the wave surface.

The present inventors have also found that it is possible to suppress an increase in the reflectance in a wide wavelength range if the ratio (a/λ) of the amplitude a to the wavelength λ of a wave surface (that is, the width a of the vibration of the wave surface) is increased. However, although it is possible to increase the ratio (a/λ) in simulations, it is difficult to do so in an actual process of forming an optical unit.

As described above, the formation of a multilayered coating film on a surface may suppress an increase in the reflectance in a wide wavelength range. With this method, however, the number of layers of a coating film is increased, and thus, in terms of the cost, throughput, and membrane stress, it is difficult to suppress an increase in the reflectance in a wide wavelength range by the formation of a multilayered coating film.

The present inventors have also been committed to an intensive study of a technique for suppressing an increase in the reflectance in a wide wavelength range by changing the above-described ratio (a/λ) to a range which is feasible in an actual process of forming an optical unit. As a result, the present inventors have found the following configuration. By controlling the shape of a wave surface of an optical unit, the inflection point of an area S of a cross section obtained by cutting through the wave surface in a plane perpendicular to a vibration direction of the wave surface is positioned toward the bottom point of the wave surface from the center of the vibration.

As a method for controlling the shape of a wave surface of an optical unit, the present inventors have found the following technique. A surface layer is deposited on the molding surface (wave surface) of a master so as to adjust the shape of the molding surface, and then, an optical unit is formed as a replica by using the master having the adjusted molding surface.

Embodiments of the present technology will be described below in the following order.
1. First Embodiment (Examples of Optical Unit Having Antireflection Function)
2. Second Embodiment (Example of Imaging Device)
3. Third Embodiment (Example of Imaging Device)
4. Fourth Embodiment (Example of Display Device)
5. Fifth Embodiment (Example of Display Device)
6. Sixth Embodiment (Example of Electronic apparatus)

1. First Embodiment

[Configuration of Optical Unit]

Figure 1B:
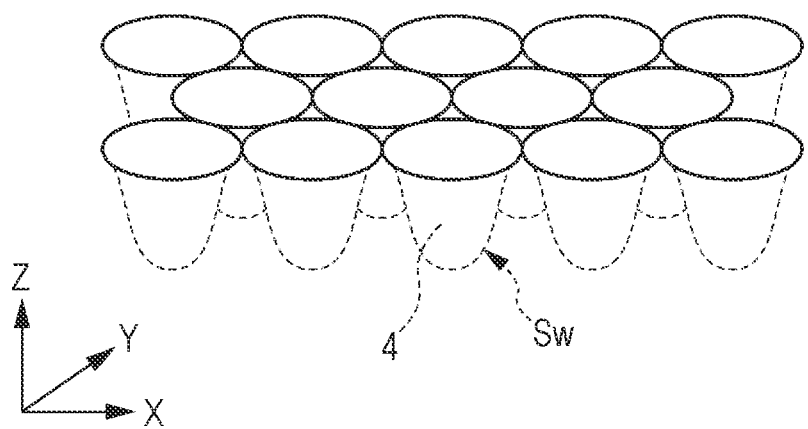
FIG. 1B is an enlarged perspective view of part of the surface of the optical unit shown in FIG. 1A.
Figure 2A:
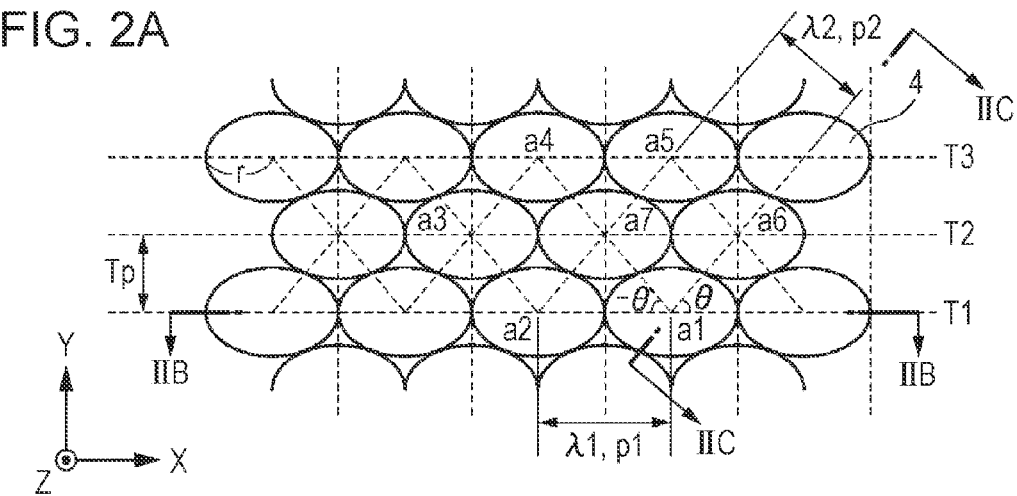
FIG. 2A is an enlarged plan view of part of the surface of the optical unit shown in FIG. 1A.
Figure 2B:
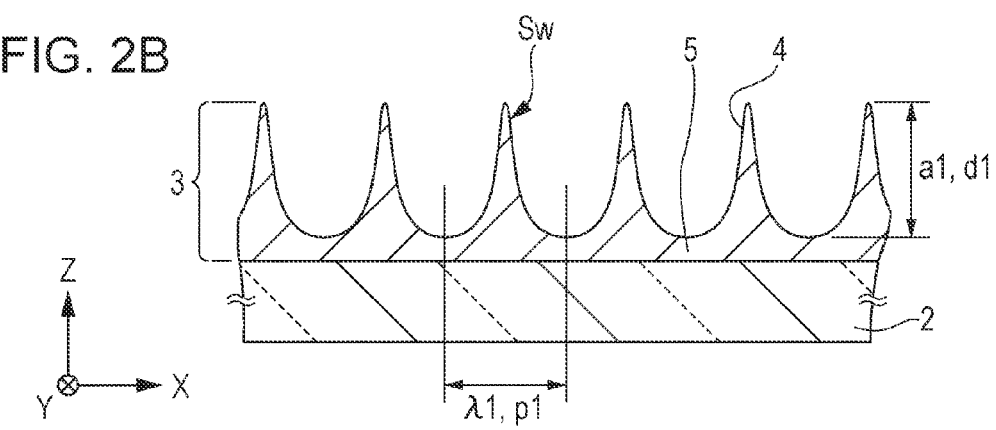
FIG. 2B is a sectional view taken along line IIB-IIB of FIG. 2A.
Figure 2C:
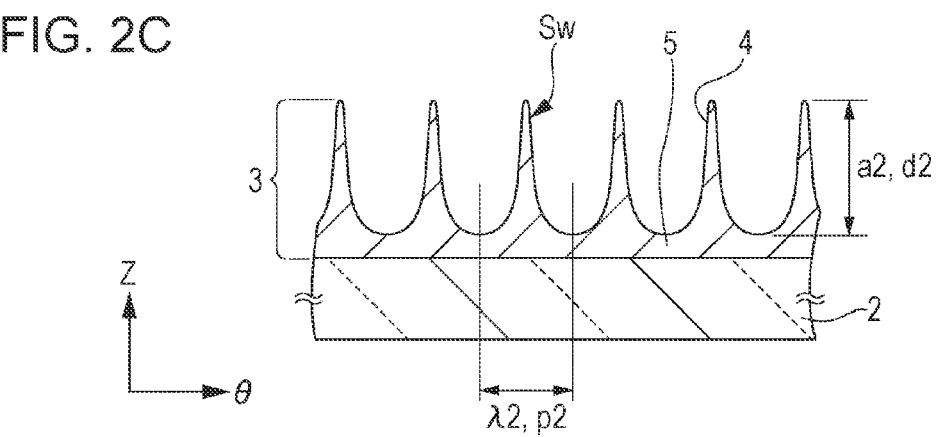
FIG. 2C is a sectional view taken along line IIC-IIC of FIG. 2A.

FIG. 1A is a plan view illustrating an example of the configuration of an optical unit 1 according to a first embodiment of the present technology. FIG. 1B is an enlarged perspective view of part of the surface of the optical unit 1 shown in FIG. 1A. FIG. 2A is an enlarged plan view of part of the surface of the optical unit 1 shown in FIG. 1A. FIG. 2B is a sectional view taken along line IIB-IIB of FIG. 2A. FIG. 2C is a sectional view taken along line IIC-IIC of FIG. 2A. In this specification, two directions orthogonal to each other in a plane on the surface of the optical unit 1 will be referred to as an "X-axis direction" and a "Y-axis direction", and a direction perpendicular to this surface of the optical unit 1 will be referred to as a "Z-axis direction". In a plane (XY plane) of the optical unit 1, the direction in which a predetermined angle θ is formed with respect to the X-axis direction will be referred to as a "θ direction".

The optical unit 1, which is an optical unit having an antireflection function, is suitably applied to a surface on which light impinges. More specifically, the optical unit 1 is suitably applied to the surface of an optical element, an optical system, an optical instrument, an imaging device, and an electronic apparatus. Examples of the optical element are a lens, a filter, a transflective mirror, a dimmer element, a prism, and a polarizing element, however, the optical element is not restricted thereto. Examples of the imaging device are a camera and a video camera, however, the imaging device is not restricted thereto. Examples of the optical instrument are a telescope, a microscope, an exposure device, a measuring device, an inspection device, and an analysis device, however, the optical instrument is not restricted thereto. Examples of the electronic apparatus are a digital camera, a digital video camera, a touch panel (input device), a display device, a television set, a personal computer (PC), a cellular phone, and a tablet computer, however, the electronic apparatus is not restricted thereto.

The optical unit 1 has a wave surface Sw on at least one of the surfaces of the optical unit 1. In FIGS. 2B and 2C, the configuration in which the optical unit 1 has a wave surface Sw on one of the surfaces is shown by way of example. The optical unit 1 includes a shape layer 3. If necessary, the optical unit 1 may also include a base member 2, in which case, the shape layer 3 may be disposed on at least one of the surfaces of the base member 2. If the optical unit 1 is constituted only by the shape layer 3, it is preferable that the shape layer 3 is directly disposed on a surface of an optical member, such as a lens or a filter. The optical unit 1 preferably has flexibility, since this makes it easier to apply the optical unit 1 to a surface, such as a display surface or an input surface.

(Base Member)

The base member 2 is, for example, a transparent member. As a material for the base member 2, an organic material, such as a plastic material, or an inorganic material, such as glass, may be used. In terms of light fastness, an inorganic material, such as glass, is preferably used.

As glass, soda-lime glass, lead glass, hard glass, quartz glass, or liquid crystallized glass (see "Handbook of Chemistry" Basic Edition (Kagaku Binran kiso-hen), P.I-537, edited by The Chemical Society of Japan) is used. As a plastic material, in terms of optical characteristics, for example, the transparency, refractive index, and dispersion, and also, various other characteristics, such as impact resistance, heat resistance, and durability, it is preferable to utilize: a (meth)acrylic resin, such as a copolymer of polymethyl methacrylate or methyl methacrylate and another alkyl (meth)acrylate or a vinyl monomer, for example, styrene; a polycarbonate resin, such as polycarbonate or diethylene glycol bis allyl carbonate (CR-39); a thermosetting (meth) acrylic resin, such as a homopolymer or a copolymer of (brominated) bisphenol A di(meth)acrylate, or a polymer or a copolymer of an urethane modified monomer of (brominated) bisphenol A mono(meth)acrylate; polyester, in particular, polyethylene terephthalate, polyethylene naphthalate, and unsaturated polyester, an acrylonitrile styrene copolymer, polyvinyl chloride, polyurethane, epoxy resin, polyarylate, polyethersulfone, polyetherketone, cyclic olefin polymer (trade names: ARTON and Zeonor), and cyclic olefin copolymer. Alternatively, an aramid resin may be used in terms of the heat resistance.

If a plastic material is used as the base member 2, in order to further improve the surface energy, application properties, sliding properties, and the flatness on a plastic surface, an undercoat layer may be disposed as surface-treating of the base member 2. As the undercoat layer, an organo alkoxysilyl metal compound, polyester, acrylic modified polyester, or polyurethane may be used. Alternatively, corona discharge or ultraviolet (UV) irradiation may be performed on the surface of the base member 2, in which case, advantages similar to those obtained by the provision of an undercoat layer may be achieved.

The base member 2 may be formed, for example, in a film-like, sheet-like, or block-like shape. However, the base member 2 is not particularly restricted to these shapes. It is assumed that a film-like shape includes a sheet-like shape. The thickness of the base member 2 is, for example, about 25 to 500 μm. If the base member 2 is made of a plastic film, it may be obtained by stretching the above-described resin or by diluting the above-described resin with a solvent and by forming the resin into a film-like shape and drying it. The base member 2 may be an element which forms a member or a device to which the optical unit 1 is applied.

The surface configuration of the base member 2 is not restricted to a planar face, but may be a projecting-and-recessed face, a polygonal face, a curved face, or a combination thereof. Examples of the curved face are a partially spherical face, a partially elliptical face, a partially paraboloid face, and a free-formed face. The partially spherical face, the partially elliptical face, and the partially paraboloid face are a partial face of a spherical face, an elliptical face, and a paraboloid face, respectively.

(Shape Layer)

The shape layer 3 is, for example, a transparent layer. The shape layer 3 includes at least one composition selected from a group consisting of a radiation curing resin composition, a thermosetting resin composition, and a thermoplastic resin composition. If necessary, the shape layer 3 may also contain an additive, such as a polymerization initiator, light stabilizer, ultraviolet absorbent, catalyst, antistatic agent, slip additive, levelling agent, anti-foaming agent, polymerization accelerator, antioxidant, flame retardant, infrared absorbent, surfactant, surface modifier, thixotropic agent, and plasticizer.

The shape layer 3 has a three-dimensional wave surface Sw. Due to the provision of this wave surface Sw, an antireflection function is provided to the surface of the optical unit 1. In FIGS. 2B and 2C, the configuration in which the optical unit 1 has a wave surface Sw on one of the surfaces of the optical unit 1 is shown by way of example.

The wave surface Sw has periodic characteristics, for example, in an in-plane direction (XY in-plane direction) of the optical unit 1. In the example shown in FIGS. 2A through 2C, the wave surface Sw has periodic characteristics, for example, in the X-axis direction and the θ direction. A wavelength λ of the wave surface Sw may have anisotropic characteristics in the in-plane direction (XY in-plane direction) of the optical unit 1. In the example shown in FIGS. 2A through 2C, the wavelength λ of the wave surface Sw has anisotropic characteristics in the X-axis direction and the θ direction, and the wavelength λ in the X-axis direction is λ1, while the wavelength λ in the θ direction is λ2. The wavelength λ1 in the X-axis direction and the wavelength λ2 in the θ direction satisfy, for example, a relationship represented by λ1>λ2. The amplitude a of the wave surface Sw may have anisotropic characteristics in the in-plane direction (XY in-plane direction) of the optical unit 1. In the example shown in FIGS. 2B and 2C, the amplitude a of the wave surface Sw has anisotropic characteristics in the X-axis direction and the θ direction, and the amplitude a in the X-axis direction is a1, while the amplitude a in the θ direction is a2. The amplitude a1 in the X-axis direction and the amplitude a2 in the θ direction satisfy, for example, a relationship represented by a1<a2.

The wavelength λ of the wave surface Sw is preferably a wavelength equal to or shorter than that of visible light. If the wavelength λ of the wave surface Sw is equal to or shorter than that of visible light, an antireflection function for visible light can be provided to the surface of the optical unit 1. If the wavelength λ of the wave surface Sw has anisotropic characteristics, it is assumed that the longest wavelength of the wave surface Sw is the wavelength λ of the wave surface Sw. As shown in FIGS. 2A through 2C, if the wavelength λ in the X-axis direction is λ1 and the wavelength λ in the θ direction is λ2 (<λ1), the wavelength λ1 in the X-axis direction, which is the longest wavelength of the wave surface Sw, is assumed as the wavelength λ of the wave surface Sw. The wavelength λ of visible light is a wavelength contained in a wavelength range of 360 to 830 nm.

The wavelength λ of the wave surface Sw is preferably 130 nm or longer. If the wavelength λ of the wave surface Sw is 130 nm or longer, the shape layer 3 can be formed in a precise shape. If the wavelength λ of the wave surface Sw has anisotropic characteristics, it is assumed that the shortest wavelength of the wave surface Sw is the wavelength λ of the wave surface Sw. As shown in FIGS. 2A through 2C, if the wavelength λ in the X-axis direction is λ1 and the wavelength λ in the θ direction is λ2 (<λ1), the wavelength λ2 in the θ direction, which is the shortest wavelength of the wave surface Sw, is assumed as the wavelength λ of the wave surface Sw.

The amplitude a of the wave surface Sw is preferably 130 nm or longer. If the amplitude a of the wave surface Sw is 130 nm or longer, the shape layer 3 can be formed in a precise shape. If the amplitude a of the wave surface Sw has anisotropic characteristics, it is assumed that the shortest amplitude of the wave surface Sw is the amplitude a of the wave surface Sw. As shown in FIGS. 2B and 2C, if the amplitude a in the X-axis direction is a1 and the amplitude a in the θ direction is a2 (>a1), the amplitude a1 in the X-axis direction, which is the shortest amplitude of the wave surface Sw, is assumed as the amplitude a of the wave surface Sw.

The amplitude a of the wave surface Sw is preferably 400 nm or shorter. If the amplitude a of the wave surface Sw is 400 nm or shorter, the generation of diffracted light can be suppressed. If the amplitude a of the wave surface Sw has anisotropic characteristics, it is assumed that the longest amplitude of the wave surface Sw is the amplitude a of the wave surface Sw. As shown in FIGS. 2B and 2C, if the amplitude a in the X-axis direction is a1 and the amplitude a in the θ direction is a2 (>a1), the amplitude a2 in the θ direction, which is the longest amplitude of the wave surface Sw, is assumed as the amplitude a of the wave surface Sw.

Figure 3:
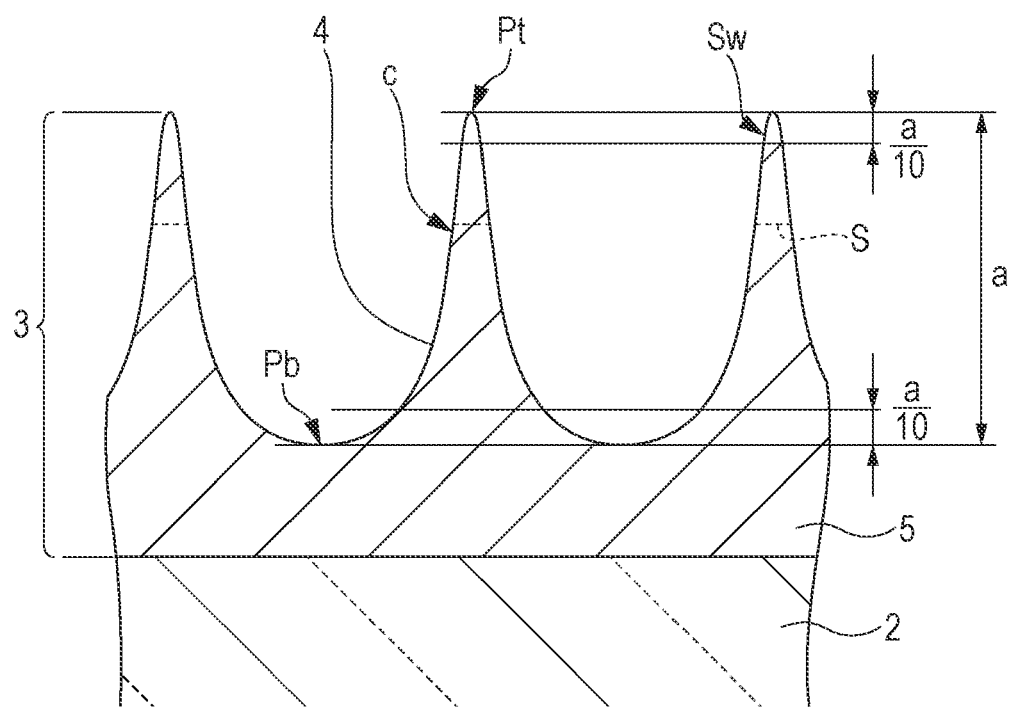
FIG. 3 is an enlarged sectional view of part of the surface of the optical unit shown in FIG. 2B.

FIG. 3 is an enlarged sectional view of part of the surface of the optical unit 1 shown in FIG. 2B. The wave surface Sw has a curved plane c which curves in a recessed shape with respect to the surface of the optical unit 1 between an apex Pt and a bottom Pb. It is preferable that the curved plane c tilts gently from the apex Pt toward the bottom Pb. The gradient of the curved plane c is a gradient of the shape of a section (that is, a sectional profile) which is obtained by cutting through the wave surface Sw by including its bottom point in a plane parallel with the vibration direction (Z-axis direction) of the wave surface Sw.

Figure 4:
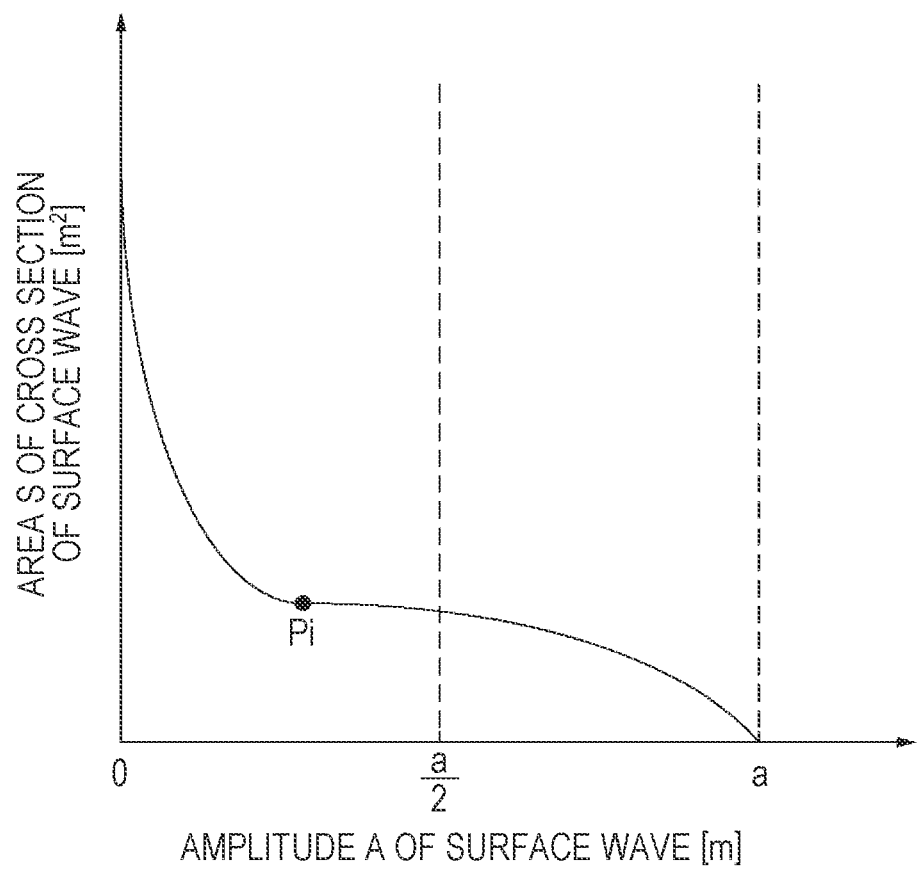
FIG. 4 is a graph illustrating a change in an area S of a cross section of a wave surface of the optical unit with respect to an amplitude A of the wave surface.

FIG. 4 is a graph illustrating a change in the area S of a cross section of the wave surface Sw with respect to the amplitude A of the wave surface Sw of the optical unit 1. In FIG. 4, the minimum position $P_{min}$ of the vibration of the wave surface Sw is set to be a reference value 0, and the maximum position $P_{max}$ of the vibration of the wave surface Sw is set to be +a. The maximum position $P_{max}$ of the vibration of the wave surface Sw refers to a position at which the wave surface Sw is raised to the highest position on the surface (in the XY plane) of the optical unit 1. The minimum position $P_{min}$ of the vibration of the wave surface Sw refers to a position at which the wave surface Sw is reduced to the lowest position on the surface (in the XY plane) of the optical unit 1.

As shown in FIG. 3, the area of a cross section obtained by cutting through the wave surface Sw in a plane perpendicular to the vibration direction of the wave surface Sw is defined as the area S. As shown in FIG. 4, an inflection point Pi indicates a change in the direction of a curve representing the area S with respect to the vibration direction of the wave surface Sw. The inflection point Pi of the area S is positioned toward the bottom Pb of the wave surface Sw from the center of the vibration of the wave surface Sw. With this configuration, even if the wave surface Sw has a curved plane c which curves in a recessed shape between the apex Pt and the bottom Pb, the antireflection characteristics can be improved. The center of the vibration of the wave surface Sw is located at a position by a distance of a/2 toward the +Z-axis direction from the minimum position $P_{min}$ of the vibration of the wave surface Sw. The vibration direction of the wave surface Sw is the Z-axis direction perpendicular to the XY plane.

The volume of an element of the wave surface Sw in a range from the maximum position $P_{max}$ of the vibration of the wave surface Sw to a position by a distance of a/10 (a is the amplitude of the wave surface Sw) toward the −Z-axis direction is indicated by va, and the volume of an element of the wave surface Sw in a range from the minimum position $P_{min}$ of the vibration of the wave surface Sw to a position by a distance of a/10 toward the +Z-axis direction is indicated by vb. In this case, va and vb are preferably satisfy a relationship represented by va<vb. With this relationship, the antireflection performance can be improved. In this case, as viewed from the surface on which the wave surface Sw is formed, the direction away from the wave surface Sw is assumed as the +Z-axis direction, and the direction closer to the wave surface Sw is assumed as the −Z-axis direction.

If the volume of an element of the wave surface Sw in a range from the minimum position $P_{min}$ to the maximum position $P_{max}$ of the vibration of the wave surface Sw is defined as the volume V, the ratio R of the volume va to the volume V (R=(va/V)×100) is preferably 10% or smaller. With this ratio R, the antireflection performance can be improved.

As shown in FIG. 1B, the wave surface Sw is formed by two-dimensionally arranging a plurality of pits 4 with pitches equal to or shorter than the wavelength of visible light. If the optical unit 1 includes the base member 2, an intermediate layer 5 may be disposed between the pits 4 and the base member 2. The pits 4 are arranged, as shown in FIG. 2A, such that a plurality of rows of tracks T1, T2, T3, and so on (hereinafter may also be collectively referred to as a "track T") are formed on the surface of the optical unit 1. In this specification, a track is constituted by a straight line in which the pits 4 are continuously arranged. A column direction is a direction orthogonal to the direction (X-axis direction) in which a track extends on the surface (in the XY plane) of the base member 2.

The pits 4 are arranged such that they are displaced from each other by half pitch between two adjacent tracks T. More specifically, at the intermediate position of a pit 4 arranged in one track T (for example, T1), the end of a pit 4 arranged in an adjacent track T (for example, T2) is positioned, so that the pits 4 arranged in adjacent tracks are displaced from each other by half pitch. As a result, the pits 4 are arranged, as shown in FIG. 2A, such that they form a hexagonal lattice pattern or a quasi-hexagonal lattice pattern in which, among the adjacent three tracks T1 through T3, the centers of the pits 4 are positioned at points a1 through a7. A hexagonal lattice is a lattice having the shape of an equilateral hexagon. A quasi-hexagonal lattice is a lattice having the shape of a distorted hexagon, unlike a lattice having the shape of an equilateral hexagon. For example, if the pits 4 are linearly arranged, a quasi-hexagonal lattice is a hexagonal lattice distorted by extending a lattice having the shape of an equilateral hexagon in a linear direction (track direction) of the arrangement of the pits 4. If the pits 4 are arranged in a meandering shape, a quasi-hexagonal lattice is a hexagonal lattice obtained by distorting a lattice having the shape of an equilateral hexagon in accordance with a meandering arrangement of the pits 4 or a hexagonal lattice obtained by extending a lattice having the shape of an equilateral hexagon in a linear direction (track direction) of the arrangement of the pits 4 and by distorting this lattice in accordance with a meandering arrangement of the pits 4.

If the pits 4 are arranged such that they form a quasi-hexagonal lattice pattern, as shown in FIG. 2A, a pitch p1 (between a1 and a2) in the arrangement of the pits 4 within the same track (for example, T1) may be longer than a pitch in the arrangement of the pits 4 between two adjacent tracks (for example, T1 and T2), that is, a pitch p2 (for example, between a1 and a7 or a2 and a7) of the pits 4 arranged in the ±θ direction with respect to the extending direction (X-axis direction) of tracks.

In terms of easiness of molding, the pits 4 preferably have a cone shape or a cone shape obtained by extending or shrinking a cone shape in the track direction. The pits 4 preferably have an axis-symmetrical cone shape or an axis-symmetrical cone shape obtained by extending or shrinking an axis-symmetrical cone shape in the track direction.

In terms of the formation of the optical unit 1 by using a manufacturing method discussed later, the pits 4 preferably have a cone shape having a base in which the length in the extending direction of tracks (X-axis direction) is longer than the width in the column direction (Y-axis direction) orthogonal to the extending direction of the tracks. More specifically, the pits 4 preferably have an elliptical pyramid shape in which the base is an elliptical circular, an elongated circular, or an oval shape having a long axis and a short axis and the vertex has a curved face.

Although in FIGS. 1A through 2C the pits 4 are formed in the same shape, they may be formed in different shapes. For example, pits 4 having two or more different shapes may be disposed on the surface of the base member 2.

In an in-plane direction (XY in-plane direction) of the optical unit 1, the pits 4 are disposed, for example, with predetermined pitches in a predetermined direction. In the example shown in FIGS. 2A through 2C, the pits 4 are disposed with predetermined pitches in the X-axis direction and in the θ direction. The pitch p in the arrangement of the pits 4 may have anisotropic characteristics in the in-plane direction (XY in-plane direction) of the optical unit 1. In the example shown in FIGS. 2A through 2C, the pitch p between the pits 4 has anisotropic characteristics in the X-axis direction and in the θ direction. The pitch in the X-axis direction is indicated by the pitch p1, while the pitch in the θ direction is indicated by the pitch p2. In this case, the pitches p1 and p2 satisfy, for example, a relationship represented by p1>p2. The depth d of the pits 4 may have anisotropic characteristics in the in-plane direction (XY in-plane direction) of the optical unit 1. In the example shown in FIGS. 2B and 2C, the depth d of the pits 4 has anisotropic characteristics in the X-axis direction and in the θ direction. The depth d of the pits 4 in the X-axis direction is indicated by d1, while the depth d of the pits 4 in the θ direction is indicated by d2. In this case, the depths d1 and d2 of the pits 4 satisfy, for example, a relationship represented by d1<d2.

The pitch p in the arrangement of the pits 4 preferably has a wavelength equal to or shorter than that of visible light. If the pitch p of the pits 4 is equal to or shorter than that of visible light, an antireflection function of preventing the reflection of visible light can be provided to the surface of the optical unit 1. If the pitch p in the arrangement of the pits 4 has anisotropic characteristics, it is assumed that the largest pitch p in the arrangement of the pits 4 is the pitch p in the arrangement of the pits 4. As shown in FIGS. 2A through 2C, if the pitch p in the X-axis direction is p1 and the pitch p in the θ direction is p2 (<p1), the pitch p in the X-axis direction, which is the largest pitch p in the arrangement of the pits 4, is assumed as the pitch p in the arrangement of the pits 4.

The pitch p in the arrangement of the pits 4 is preferably 130 nm or larger. If the pitch p in the arrangement of the pits 4 is 130 nm or larger, the shape layer 3 can be formed in a precise shape. If the pitch p in the arrangement of the pits 4 has anisotropic characteristics, it is assumed that the smallest pitch in the arrangement of the pits 4 is the pitch p in the arrangement of the pits 4. As shown in FIGS. 2A through 2C, if the pitch p in the X-axis direction is p1 and the pitch p in the θ direction is p2 (<p1), the pitch p2 in the θ direction, which is the smallest pitch p in the arrangement of the pits 4, is assumed as the pitch p in the arrangement of the pits 4.

The depth d of the pits 4 is preferably 130 nm or larger. If the depth d of the pits 4 is 130 nm or larger, the shape layer 3 can be formed in a precise shape. If the depth d of the pits 4 has anisotropic characteristics, it is assumed that the smallest depth d of the pits 4 is the depth d of the pits 4. As shown in FIGS. 2B and 2C, if the depth d of the pits 4 in the X-axis direction is d1 and the depth d of the pits 4 in the θ direction is d2 (>d1), the depth d1 in the X-axis direction, which is the smallest depth d of the pits 4, is assumed as the depth d of the pits 4.

The depth d of the pits 4 is preferably 400 nm or smaller. If the depth d of the pits 4 is 400 nm or smaller, the generation of diffracted light can be suppressed. If the depth d of the pits 4 has anisotropic characteristics, it is assumed that the largest depth d of the pits 4 is the depth d of the pits 4. As shown in FIGS. 2B and 2C, if the depth d in the X-axis direction is d1 and the depth d in the θ direction is d2 (>d1), the depth d2 of the pits 4 in the θ direction, which is the largest depth d of the pits 4, is assumed as the depth d of the pits 4.

The depth d of the pits 4 does not have to be the same, and instead, the pits 4 may have a certain depth distribution. The depth distribution means that pits 4 having two or more depths d are formed on the surface of the base member 2. That is, pits 4 having a reference depth d and pits 4 having a depth d different from this reference depth d are disposed on the surface of the base member 2. Pits 4 having a depth d different from the reference depth d are disposed on the surface of the base member 2, for example, regularly or randomly. Such pits 4 may be disposed regularly in the extending direction of the tracks (X-axis direction) or in the column direction (Y-axis direction).

End portions of the openings of adjacent pits 4 may be connected to each other. For example, the end portions of the openings of the pits 4 may be connected to each other in the track direction (X-axis direction), in the θ direction, or in both of the track direction and the θ direction.

[Configuration of Replica Master]

Figure 5A:
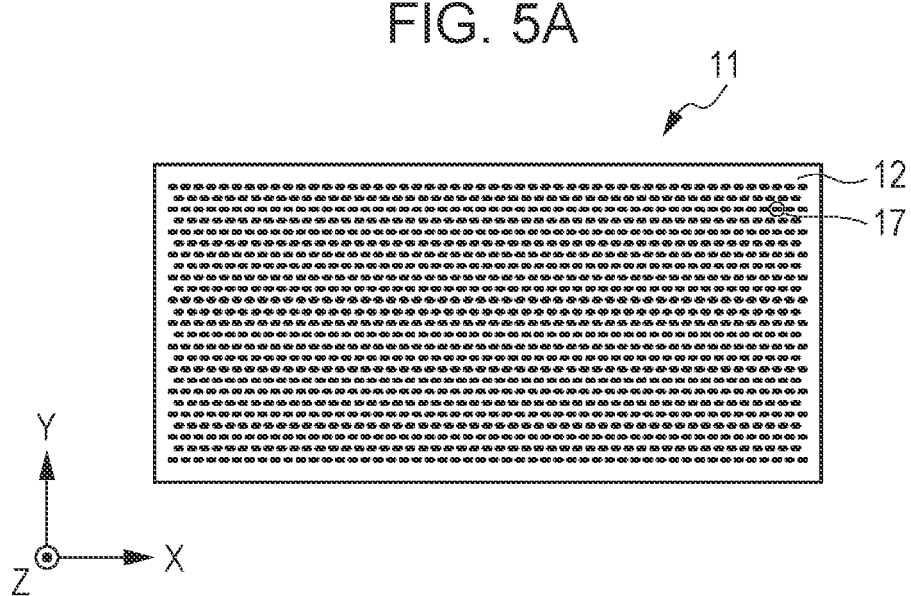
FIG. 5A is a plan view of an example of the configuration of a replica master according to the first embodiment of the present technology.
Figure 5B:
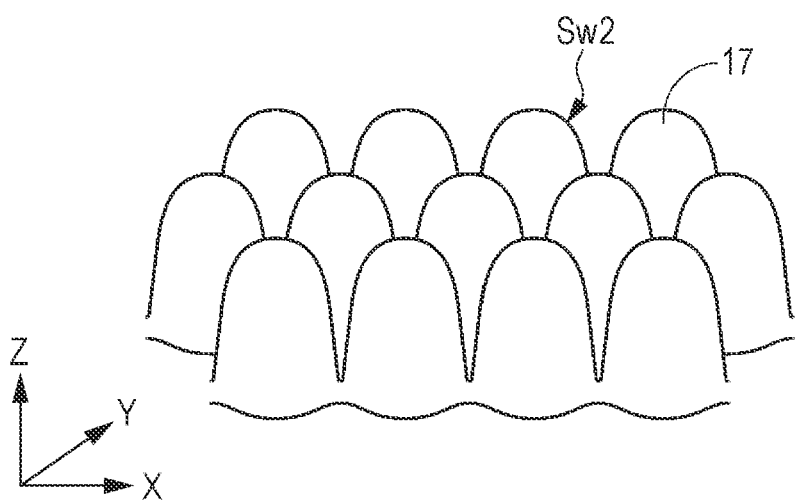
FIG. 5B is an enlarged perspective view of part of the surface of the replica master shown in FIG. 5A.
Figure 6A:
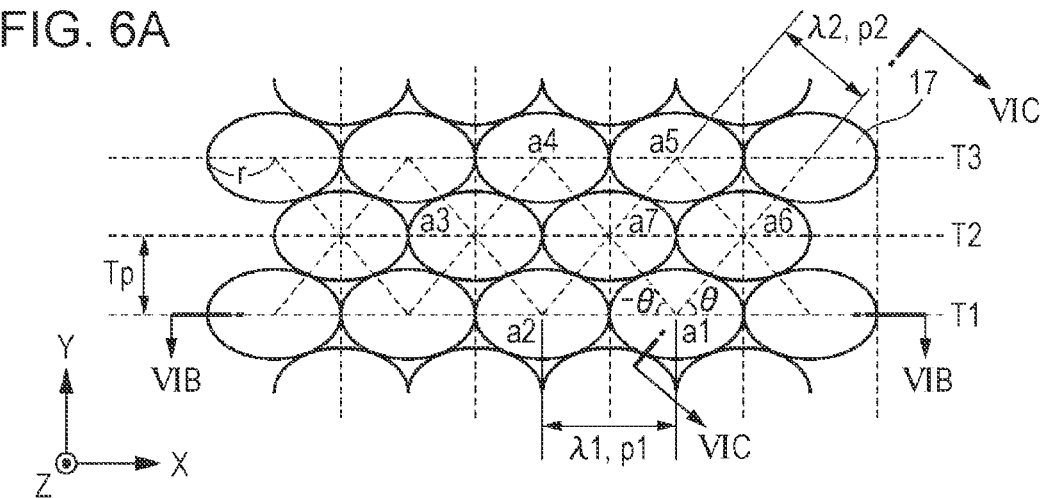
FIG. 6A is an enlarged plan view of part of the surface of the replica master shown in FIG. 5A.
Figure 6B:
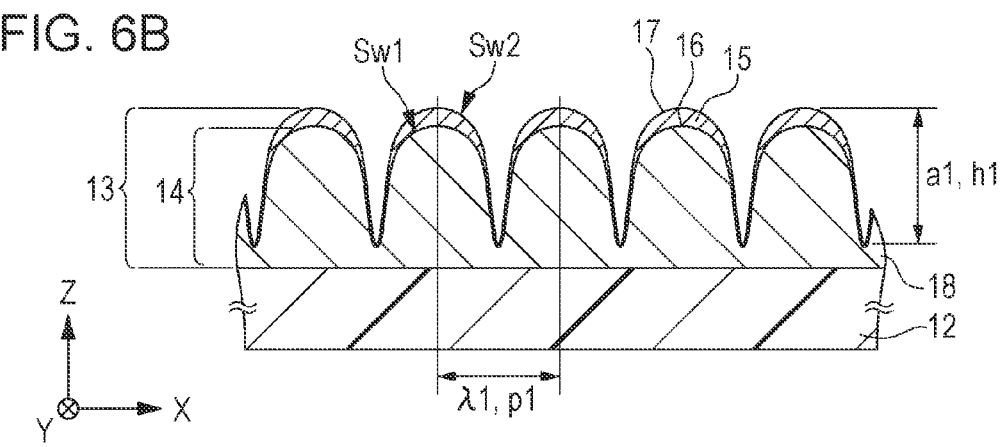
FIG. 6B is a sectional view taken along line VIB-VIB of FIG. 6A.
Figure 6C:
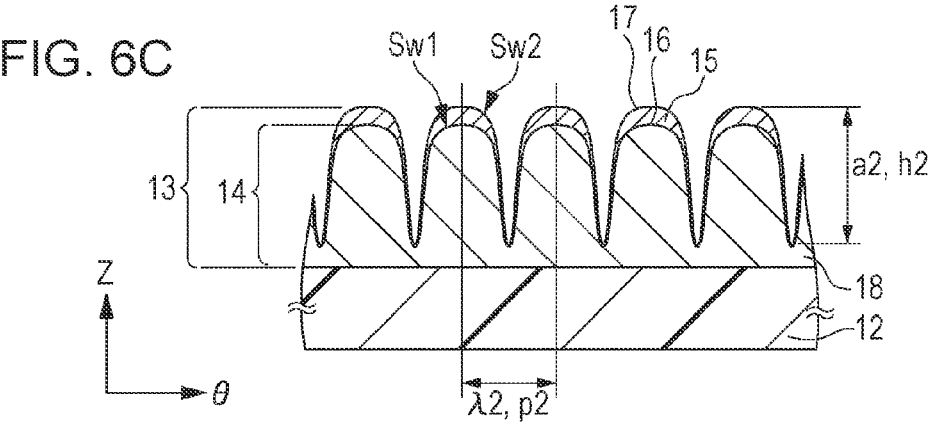
FIG. 6C is a sectional view taken along line VIC-VIC of FIG. 6A.

FIG. 5A is a plan view of an example of the configuration of a replica master 11 according to the first embodiment of the present technology. FIG. 5B is an enlarged perspective view of part of the surface of the replica master 11 shown in FIG. 5A. FIG. 6A is an enlarged plan view of part of the surface of the replica master 11 shown in FIG. 5A. FIG. 6B is a sectional view taken along line VIB-VIB of FIG. 6A. FIG. 6C is a sectional view taken along line VIC-VIC of FIG. 6A. In this specification, two directions orthogonal to each other in a plane on the surface of the replica master 11 will be referred to as an "X-axis direction" and a "Y-axis direction", and a direction perpendicular to this surface of the replica master 11 will be referred to as a "Z-axis direction". In a plane (XY plane) of the replica master 11, the direction in which a predetermined angle θ is formed with respect to the X-axis direction will be referred to as a "θ direction".

The replica master 11 is a master for forming the optical unit 1 configured as described above, and more specifically, a master for forming the wave surface Sw on the surface of the above-described optical unit 1. The replica master 11 is formed, for example, in a film-like, sheet-like, or block-like shape, and the surface of the replica master 11 serves as a molding surface for forming the wave surface Sw on the surface of the optical unit 1. A three-dimensional wave surface Sw1 is formed on this molding surface. The wavelength λ of the wave surface Sw1 is preferably a wavelength equal to or shorter than that of visible light.

The replica master 11 has a wave surface (first wave surface) Sw1 and a wave surface (second wave surface) Sw2 disposed on the wave surface Sw1. The amplitude a of the wave surface Sw2 is preferably longer than that of the wave surface Sw1. With this configuration, the antireflection characteristics can be improved.

The replica master 11 has the wave surface Sw2 on one of the surfaces of the replica master 11. The replica master 11 includes a surface shape layer 13. If necessary, the replica master 11 may also include a base member 12, in which case, the surface shape layer 13 may be disposed on one of the surfaces of the base member 12. The replica master 11 may preferably have flexibility.

(Base Member)

The base member 12 is similar to the base member 2 of the optical unit 1.

(Surface Shape Layer)

The surface shape layer 13 includes a base shape layer 14 and a surface layer 15 disposed on the surface of the base shape layer 14. If the replica master 11 also includes the base member 12, the base shape layer 14 is disposed on the surface of the base member 12. If the replica master 11 is constituted only by the surface shape layer 13, the base shape layer 14 serves as the body of the replica master 11. If the replica master 11 also includes the base member 12, the base member 12 and the base shape layer 14 serve as the body of the replica master 11.

The base shape layer 14 has transparency or opacity. The base shape layer 14 includes at least one of an inorganic material and an organic material. As an organic material, the base shape layer 14 includes at least one composition selected from a group consisting of a radiation curing resin composition, a thermosetting resin composition, and a thermoplastic resin composition. If necessary, the base shape layer 14 may also contain an additive, such as a polymerization initiator, light stabilizer, ultraviolet absorbent, catalyst, coloring agent, antistatic agent, slip additive, levelling agent, anti-foaming agent, polymerization accelerator, antioxidant, flame retardant, infrared absorbent, surfactant, surface modifier, thixotropic agent, and plasticizer.

The surface layer 15 has transparency or opacity. The surface layer 15 includes at least one of an inorganic material and an organic material. An inorganic material includes a dielectric, a transparent conductor, a metal, or a semiconductor.

As a dielectric, for example, an oxide, a nitride, a sulfide, a carbide, a fluoride, or a mixture thereof, may be used. An example of an oxide is an oxide of at least one element selected from a group consisting of In, Zn, Sn, Al, Si, Ge, Ti, Ga, Ta, Nb, Hf, Zr, Cr, Bi and Mg. An example of a nitride is a nitride of at least one element selected from a group consisting of In, Sn, Ge, Cr, Si, Al, Nb, Mo, Ti, Nb, Mo, Ti, W, Ta, and Zn, and preferably, a nitride of at least one element selected from a group consisting of Si, Ge, and Ti. An example of a sulfide is a Zn sulfide. An example of a carbide is a carbide of at least one element selected from a group consisting of In, Sn, Ge, Cr, Si, Al, Ti, Zr, Ta, and W, and preferably, a carbide of at least one element selected from a group consisting of Si, Ti, and W. An example of a fluoride is a fluoride of at least one element selected from a group consisting of Si, Al, Mg, Ca, and La. Examples of a mixture of such compounds are $ZnS$—$SiO_2$, $SiO_2$—$Cr_2O_3$—$ZrO_2$(SCZ), $In_2O_3$—$SnO_2$(ITO), $In_2O_3$—$CeO_2$ (ICO), $In_2O_3$—$Ga_2O_3$(IGO), $Sn_2O_3$—$Ta_2O_5$(TTO), and $TiO_2$—$SiO_2$.

As a metal, a transition metal, for example, may be used. Examples of a transition metal are Ti, V, Cr, Mn, Fe, Nb, Cu, Ni, Co, Mo, Ta, W, Zr, Ru, and Ag.

As a semiconductor, a transparent oxide semiconductor is preferably used. As a transparent oxide semiconductor, for example, a binary compound, such as $SnO_2$, $InO_2$, $ZnO$, or $CdO$, a ternary compound containing at least one element of Sn, In, Zn, and Cd, which are elements forming a binary compound, or a multi-component (composite) oxide, may be used. Specific examples of a transparent oxide semiconductor are indium tin oxide (ITO), zinc oxide (ZnO), aluminum-doped zinc oxide (AZO ($Al_2O_3$, $ZnO$)), SZO, fluorine-doped tin oxide (FTO), tin oxide ($SnO_2$), gallium-doped zinc oxide (GZO), and indium zinc oxide (IZO ($In_2O_3$, $ZnO$)). In particular, in terms of the high reliability and low resistance, indium tin oxide (ITO) is preferably used. Examples of the state of a transparent oxide semiconductor are an amorphous state, a crystalline state, and an amorphous-polycrystalline mixture state.

It is now assumed that the thickness of the surface layer 15 at the maximum position $P_{max}$ of the vibration of the wave surface Sw2 is indicated by D1, the thickness of the surface layer 15 on the slope face of the wave surface Sw2 is indicated by D2, and the thickness of the surface layer 15 at the minimum position $P_{mim}$ of the vibration of the wave surface Sw2 is indicated by D3. In this case, the thicknesses D1, D2, and D3 preferably satisfy a relationship represented by D1>D3, and more preferably, satisfy a relationship represented by D1>D3>D2.

The thickness of the surface layer 15 at the maximum position $P_{max}$ of the vibration of the wave surface Sw2 is preferably 10 nm or larger, and more preferably, in a range of 10 to 100 nm. If the thickness of the surface layer 15 is 10 nm or larger, antireflection characteristics can be improved. On the other hand, if the thickness of the surface layer 15 exceeds 100 nm, antireflection characteristics are decreased.

The wave surface Sw2 is provided on the surface of the surface layer 15. The wave surface Sw2 is formed by disposing the surface layer 15 such that it may resemble the shape of the wave surface Sw1. More specifically, the wave surface Sw2 is constituted by a plurality of surface structures 17 which are two-dimensionally arranged. The surface structures 17 are formed in a projecting shape with respect to the surface of the replica master 11. The surface structures 17 each include a base structure 16 and the surface layer 15. The surface layer 15 is disposed on the surface of the base structure 16 such that it may resemble the shape of the base structure 16.

The wave surface Sw1 is provided on the surface of the base shape layer 14. The wave surface Sw1 is constituted by a plurality of base structures 16 which are two-dimensionally arranged. The base structures 16 are formed in a projecting shape with respect to the surface of the replica master 11. If necessary, the base shape layer 14 may include an intermediate layer 18 between the base member 12 and the base structures 16. The intermediate layer 18 is integrally formed with the base structures 16 at the bottom side of the base structures 16, and is made of the same material as that of the base structures 16.

The projecting portions and the recessed portions of the wave surface Sw2 of the replica master 11 have inverted shapes of the recessed portions and the projecting portions, respectively, of the wave surface Sw of the optical unit 1 (that is, the wave surface Sw2 and the wave surface Sw have an inversion relationship). That is, the wavelength λ and the amplitude a of the replica master 11 are similar to those of the optical unit 1.

The projecting portions and the recessed portions of the plurality of surface structures 17 formed on the molding surface of the replica master 11 have inverted shapes of the recessed portions and the projecting portions, respectively, of the plurality of pits 4 formed on the surface of the optical unit 1 (that is, the surface structures 17 and the pits 4 have an inversion relationship). That is, the arrangement, size, shape, pitch p, and height h of the surface structures 17 of the replica master 11 are similar to those of the pits 4 of the optical unit 1. In this case, however, the height h of the surface structures 17 of the replica master 11 corresponds to the depth d of the pits 4 of the optical unit 1.

Figure 7:
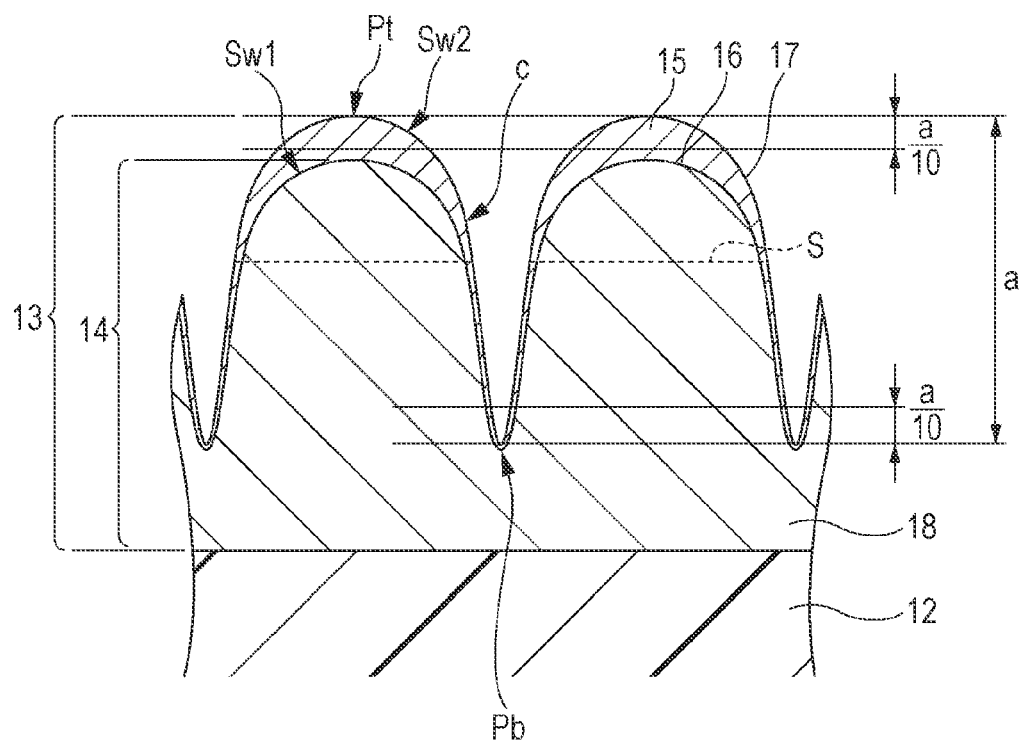
FIG. 7 is an enlarged sectional view of part of the surface of the replica master shown in FIG. 6B.

FIG. 7 is an enlarged sectional view of part of the surface of the replica master 11 shown in FIG. 6B. The wave surface Sw2 has a curved plane c which curves in a projecting shape with respect to the surface of the replica master 11 between an apex Pt and a bottom Pb. It is preferable that the curved plane c tilts more sharply from the apex Pt toward the bottom Pb. The gradient of the curved plane c is a gradient of the shape of a section (that is, a sectional profile) which is obtained by cutting through the wave surface Sw2 by including its apex point in a plane parallel with the vibration direction (Z-axis direction) of the wave surface Sw2.

Figure 8:
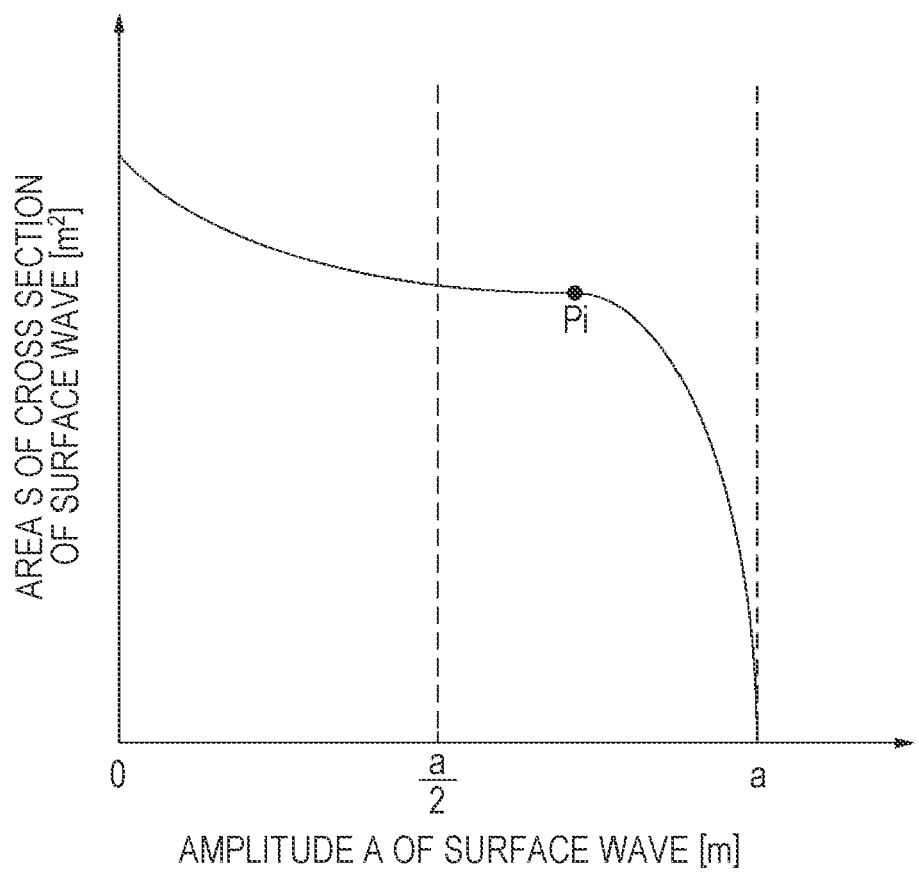
FIG. 8 is a graph illustrating a change in an area S of a cross section of a wave surface of the replica master with respect to an amplitude A of the wave surface.

FIG. 8 is a graph illustrating a change in the area S of a cross section of the wave surface Sw2 with respect to the amplitude A of the wave surface Sw2 of the replica master 11. In FIG. 8, the minimum position $P_{min}$ of the vibration of the wave surface Sw2 is set to be a reference value 0, and the maximum position $P_{max}$ of the vibration of the wave surface Sw2 is set to be +a. The maximum position $P_{max}$ of the vibration of the wave surface Sw2 refers to a position at which the wave surface Sw2 is raised to the highest position on the surface (in the XY plane) of the replica master 11. The minimum position $P_{min}$ of the vibration of the wave surface Sw2 refers to a position at which the wave surface Sw2 is reduced to the lowest position on the surface (in the XY plane) of the replica master 11.

The area of a cross section obtained by cutting through the wave surface Sw2 in a plane perpendicular to the vibration direction of the wave surface Sw2 is defined as the area S. As shown in FIG. 8, an inflection point Pi indicates a change in the direction of a curve representing the area S with respect to the vibration direction of the wave surface Sw2. The inflection point Pi of the area S is positioned toward the apex Pt of the wave surface Sw2 from the center of the vibration of the wave surface Sw2. The center of the vibration of the wave surface Sw2 is located at a position by a distance of a/2 toward the +Z-axis direction from the minimum position $P_{min}$ of the vibration of the wave surface Sw2. The vibration direction of the wave surface Sw2 is the Z-axis direction perpendicular to the XY plane.

[Configuration of Roll Master]

Figure 9A:
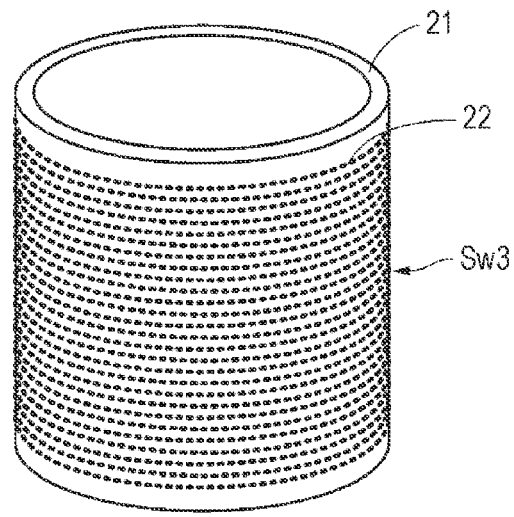
FIG. 9A is a perspective view of an example of the configuration of a roll master.
Figure 9B:
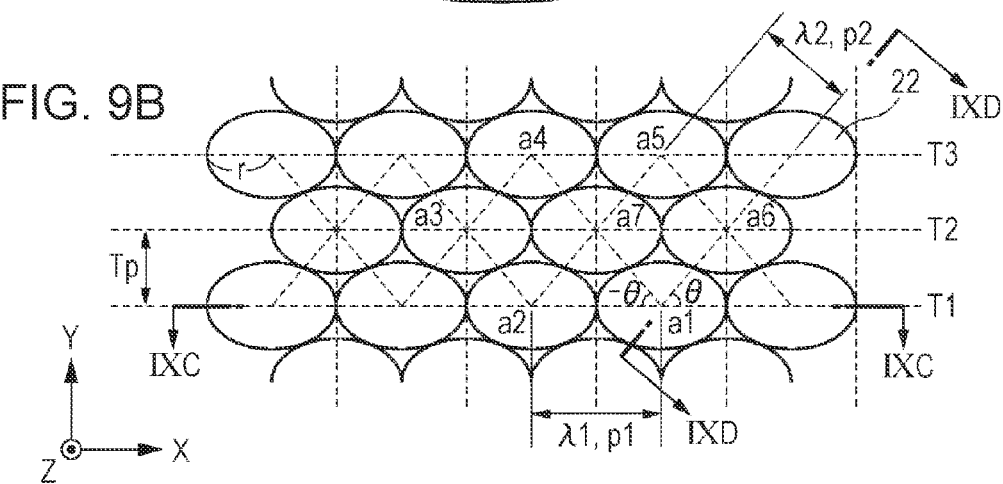
FIG. 9B is an enlarged plan view of part of the roll master shown in FIG. 9A.
Figure 9C:
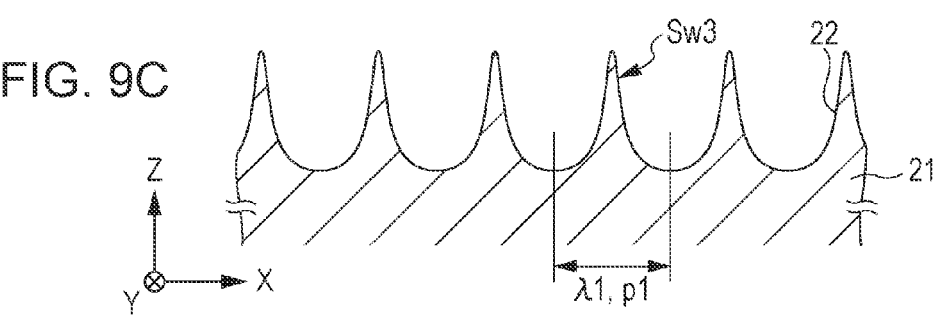
FIG. 9C is a sectional view taken along line IXC-IXC of FIG. 9B.
Figure 9D:
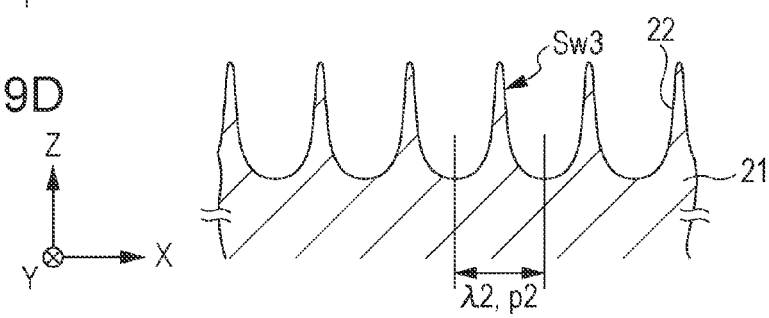
FIG. 9D is a sectional view taken along line IXD-IXD of FIG. 9B.

FIG. 9A is a perspective view illustrating an example of the configuration of a roll master 21. FIG. 9B is an enlarged plan view of part of the roll master 21 shown in FIG. 9A. FIG. 9C is a sectional view taken along line IXC-IXC of FIG. 9B. FIG. 9D is a sectional view taken along line IXD-IXD of FIG. 9B. In this specification, two directions orthogonal to each other in a plane on the surface of the roll master 21 will be referred to as an "X-axis direction" and a "Y-axis direction", and a direction perpendicular to this surface of the roll master 21 will be referred to as a "Z-axis direction". In a plane (XY plane) of the roll master 21, the direction in which a predetermined angle θ is formed with respect to the X-axis direction will be referred to as a "θ direction".

The roll master 21 is a master for forming the replica master 11 configured as described above, and more specifically, a master for forming the wave surface Sw1 on the surface of the base shape layer 14 of the above-described replica master 11. The roll master 21 has a cylindrical or tubular shape, and the cylindrical or tubular surface of the roll master 21 serves as a molding surface for forming the wave surface Sw1 on the surface of the base shape layer 14 of the replica master 11. A wave surface Sw3 is formed on this molding surface. The wave surface Sw3 is constituted by, for example, a plurality of pits 22 which are two-dimensionally arranged. The pits 22 are formed in a recessed shape with respect to the molding surface. As a material of the roll master 21, glass, for example, may be used. However, the material of the roll master 21 is not restricted to glass.

The projecting portions and the recessed portions of the wave surface Sw3 of the roll master 21 have inverted shapes of the recessed portions and the projecting portions, respectively, of the wave surface Sw1 of the replica master 11 (that is, the wave surface Sw3 and the wave surface Sw1 have an inversion relationship). That is, the wavelength λ and the amplitude a of the wave surface Sw3 of the roll master 21 are similar to those of the wave surface Sw1 of the replica master 11.

The projecting portions and the recessed portions of the plurality of pits 22 formed on the molding surface of the roll master 21 have inverted shapes of the recessed portions and the projecting portions, respectively, of the plurality of surface structures 17 formed on the surface of the replica master 11 (that is, the pits 22 and the surface structures 17 have an inversion relationship). That is, the arrangement, size, shape, pitch p, and depth d of the pits 22 of the roll master 21 are similar to those of the base structures 16 of the replica master 11. In this case, however, the depth d of the pits 22 of the roll master 21 corresponds to the height h of the base structures 16 of the replica master 11.

(Configuration of Exposure Device)

Figure 10:
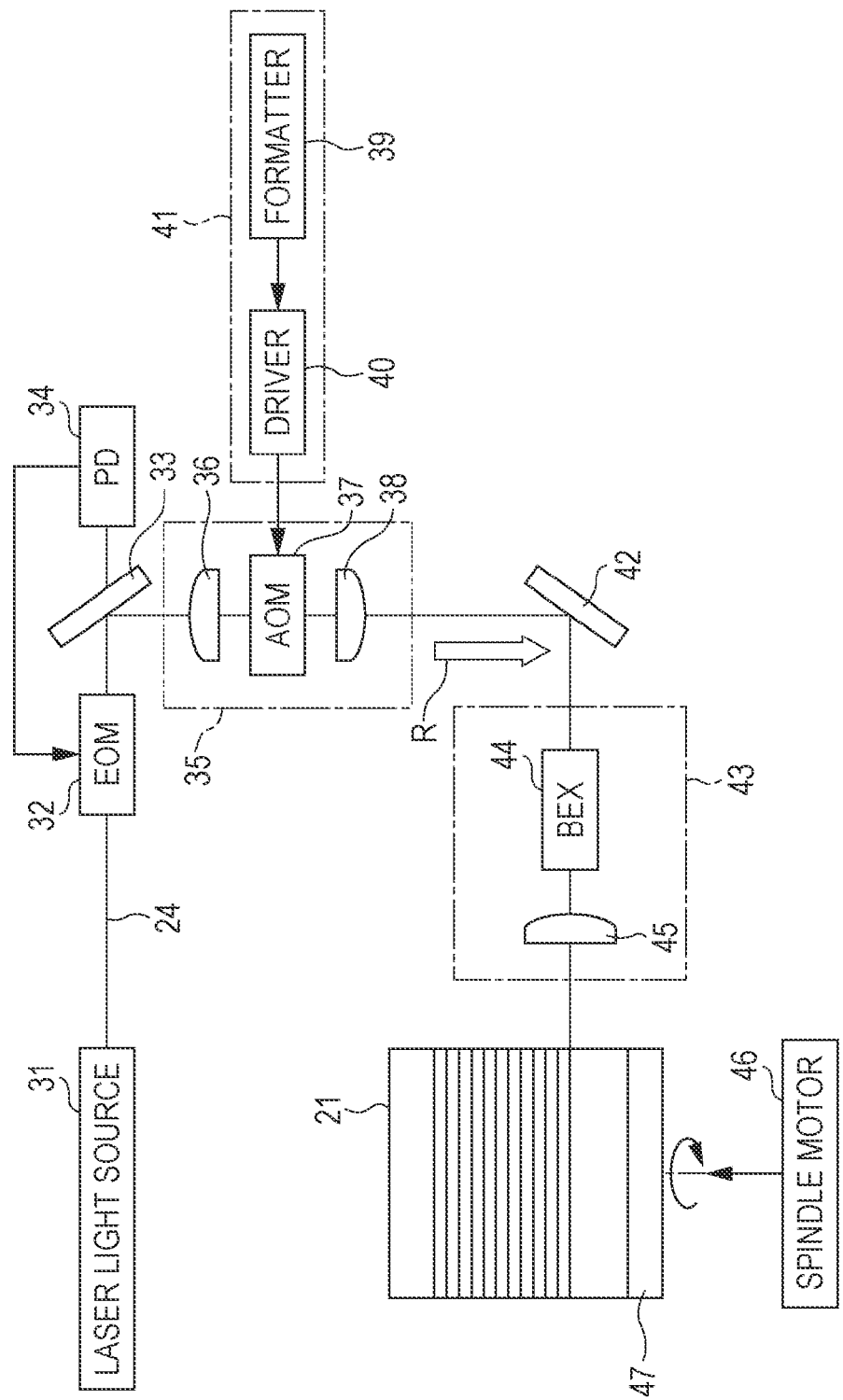
FIG. 10 is a schematic diagram illustrating an example of the configuration of a roll master exposure device for forming a roll master.

FIG. 10 is a schematic diagram illustrating an example of the configuration of a roll master exposure device for forming the roll master 21. The configuration of the roll master exposure device shown in FIG. 10 is based on an optical disc recorder.

A laser light source 31 emits light to be applied to a resist layer deposited on the surface of the roll master 21, which serves as a recording medium. The laser light source 31 emits recording laser light 24 having a wavelength λ of, for example, 266 nm. The laser light 24 emitted from the laser light source 31 advances in a straight line as a collimated beam and impinges on an electro optical modulator (EOM) 32. The laser light 24 passing through the EOM 32 is reflected by a mirror 33 and is output to a modulation optical system 35.

The mirror 33 is constituted by a polarizing beam splitter and has a function of reflecting one polarization component and of transmitting the other polarization component. The polarization component passing through the mirror 33 is received by a photodiode 34, and the EOM 32 is controlled on the basis of a signal indicating the polarization component received by the photodiode 34, thereby performing phase modulation on the laser light 24.

In the modulation optical system 35, the laser light 24 is concentrated on an acousto-optic modulator (AOM) 37 made of, for example, glass ($SiO_2$), by a condenser lens 36. The laser light 24 is then subjected to intensity modulation by the AOM 37 and diverges. The laser light 24 is then formed into a collimated beam by a lens 38. The laser light 24 output from the modulation optical system 35 is then reflected by a mirror 42 and is horizontally output to a portable optical table 43 as a collimated beam.

The portable optical table 43 includes a beam expander 44 and an objective lens 45. The laser light 24 output to the portable optical table 43 is formed into a desired beam shape by the beam expander 44 and is then applied to a resist layer on the roll master 21 via the objective lens 45. The roll master 21 is placed on a turntable 47 connected to a spindle motor 46. Then, the laser light 24 is intermittently applied to the resist layer while the roll master 21 is being rotated and while the laser light 24 is being shifted along the height of the roll master 21 by moving the portable optical table 43 in the direction indicated by the arrow R in FIG. 10, thereby forming a latent image. In this manner, a step of exposing the resist layer to the laser light 24 is performed. The latent image is formed in a generally elliptical shape having a long axis in the circumferential direction.

The roll master exposure device includes a control mechanism 41. The control mechanism 41 performs control so that a latent image corresponding to a two-dimensional pattern of the pits 22 of the roll master 21 may be formed on a resist layer. The control mechanism 41 includes a formatter 39 and a driver 40. The formatter 39 includes a polarity inverter, which controls a timing at which the laser light 24 is applied to the resist layer. The driver 40 receives an output from the polarity inverter and controls the AOM 37.

In this roll master exposure device, a signal is generated for each track of the two-dimensional pattern of the pits 22 by synchronizing a polarity inversion formatter signal with a rotation controller so that the two-dimensional pattern can be spatially linked. Then, the laser light 24 is subjected to intensity modulation by the AOM 37 on the basis of the generated signal. By performing patterning with an appropriate rotational speed at a constant angular velocity (CAV), an appropriate modulation frequency, and an appropriate feed pitch, a two-dimensional pattern, such as a hexagonal lattice pattern, can be recorded.

[Manufacturing Method for Optical Unit]

FIGS. 11A through 13D illustrate an example of a manufacturing method for the optical unit 1 according to the first embodiment of the present technology.

(Resist Forming Step)

Figure 11A:
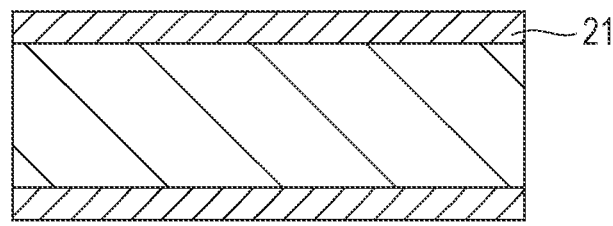
FIGS. 11A through 11C illustrate an example of a manufacturing method for an optical unit according to the first embodiment of the present technology.
Figure 11B:
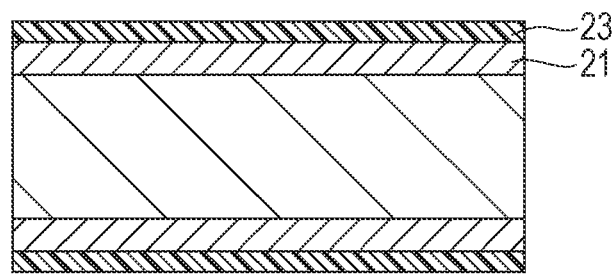

First, as shown in FIG. 11A, a cylindrical or tubular roll master 21 is prepared. The roll master 21 is, for example, a glass master. Then, as shown in FIG. 11B, a resist layer 23 is formed on the surface of the roll master 21. As a material of the resist layer 23, for example, either of an organic resist or an inorganic resist may be used. As an organic resist, a novolac resist or a chemical amplification resist, for example, may be used. As an inorganic resist, a metallic compound, for example, may be used.

(Exposure Step)

Figure 11C:
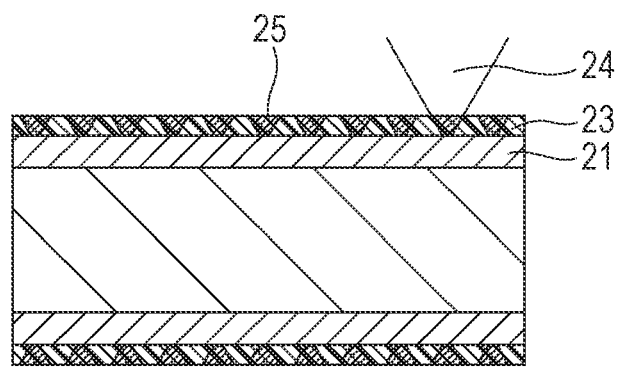

Then, as shown in FIG. 11C, laser light (exposure beam) 24 is applied to the resist layer 23 formed on the surface of the roll master 21. More specifically, the roll master 21 is placed on the turntable 47 of the roll master exposure device shown in FIG. 10, and then, the laser light (exposure beam) 24 is applied to the resist layer 23 while the roll master 21 is being rotated. In this case, the laser light 24 is intermittently applied to the resist layer 23 while being shifted along the height of the roll master 21 (in a direction parallel with the central axis of the cylindrical or tubular roll master 21). In this manner, the entire surface of the resist layer 23 can be exposed to the laser light 24. As a result, a latent image 25 based on a path of the laser light 24 is formed on the entire surface of the resist layer 23.

The latent image 25 is formed such that it constitutes a plurality of rows of tracks T and forms a predetermined lattice pattern on the surface of the roll master 21. The latent image 25 has a circular or elliptical shape. If the latent image 25 has an elliptical shape, the elliptical shape preferably has a long axis in the extending direction of the tracks T.

(Development Step)

Figure 12A:
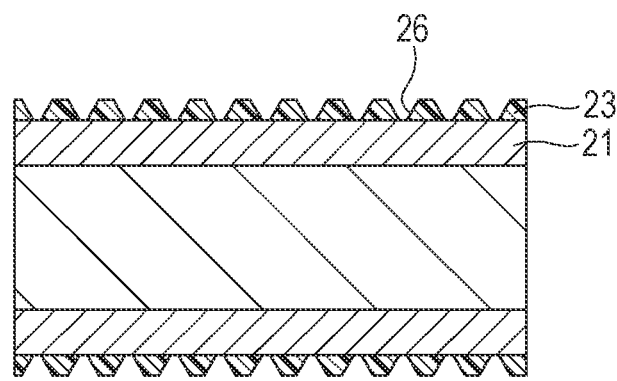
FIGS. 12A through 12C illustrate an example of a manufacturing method for an optical unit according to the first embodiment of the present technology.

Then, a developer is dripped on the resist layer 23 while the roll master 21 is being rotated, thereby developing the resist layer 23. After this development step, a plurality of openings 26 are formed on the resist layer 23, as shown in FIG. 12A. If the resist layer 23 is a positive resist, a portion of the resist layer 23 that is exposed to the laser light 24 becomes more soluble than a portion that is not exposed to the laser light 24. Accordingly, a pattern based on the latent image (exposed portion) 25 is formed on the resist layer 23. The pattern of the openings 26 is, for example, a predetermined lattice pattern.

(Etching Step)

Figure 12B:
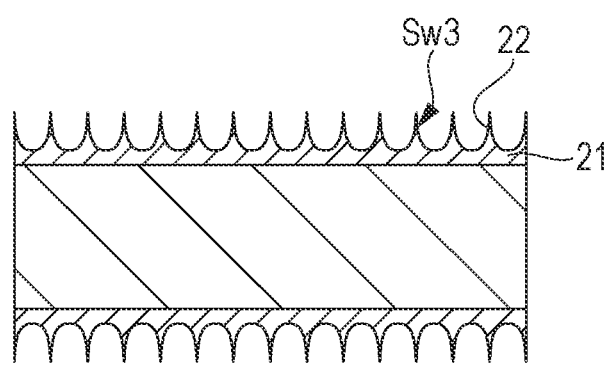

Then, by using the pattern of the resist layer 23 (resist pattern) formed on the surface of the roll master 21 as a mask, the surface of the roll master 21 is etched. As a result, as shown in FIG. 12B, the pits 22 having, for example, a cone shape, can be obtained. The cone shape is preferably an elliptical cone shape or an elliptical truncated cone shape having a long axis in the extending direction of the tracks T. As the etching processing, for example, dry etching or wet etching, may be performed. In this case, by alternately performing etching and ashing, a pattern of the pits 22 having a cone shape, for example, can be formed. As a result of performing the above-described steps, the roll master 21 is formed.

(Replica Master Forming Step)

Figure 12C:
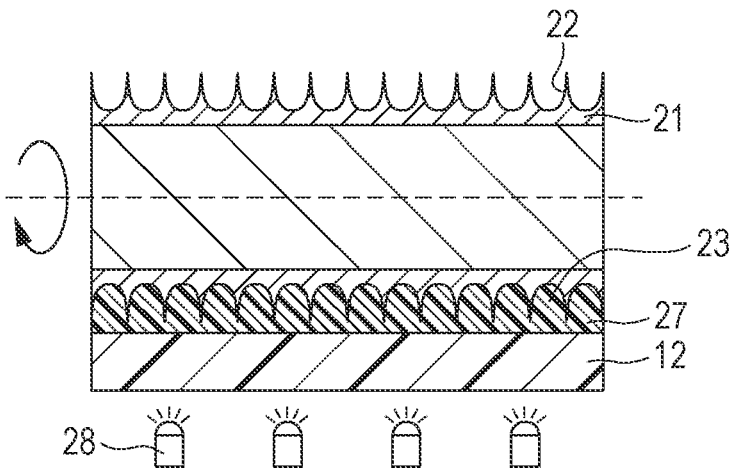
Figure 13A:
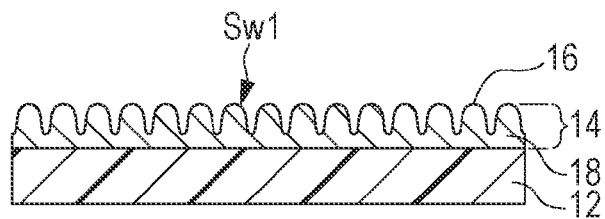
FIGS. 13A through 13D illustrate an example of a manufacturing method for an optical unit according to the first embodiment of the present technology.

Then, as shown in FIG. 12C, the roll master 21 and a transfer material 27 applied to the surface of the base member 12 are brought into close contact with each other while the roll master 21 is being rotated, and also, energy radiation, such as UV radiation, is applied to the transfer material 27 from an energy radiation source 28, thereby curing the transfer material 27. Then, while the rotation of the roll master 21 is being maintained, the base member 12 integrated with the cured transfer material 27 is released from the molding surface of the roll master 21. Then, as shown in FIG. 13A, the base shape layer 14 including the plurality of base structures 16 is formed on the surface of the base member 12. That is, the base shape layer 14 having the wave surface Sw1 is formed on the surface of the base member 12. In this case, if necessary, the intermediate layer 18 may be formed between the base structures 16 and the base member 12.

The type of energy radiation source 28 is not particularly restricted, and any source that can emit energy radiation, such as an electron beam, UV radiation, infrared radiation, laser light radiation, visible light radiation, ionizing radiation (for example, X-ray, α-radiation, β-radiation, and γ-radiation), microwave, or radio frequency, may be used.

As the transfer material 27, a radiation curing resin composition is preferably used. More preferably, a UV curable resin composition is used. A radiation curing resin composition may contain filler or a multifunctional additive, if necessary.

A UV curable resin composition contains, for example, acrylate and an initiator. A UV curable resin composition contains, for example, a mono-functional monomer, a di-functional monomer, or a poly-functional monomer. More specifically, the following materials may be used singly, or a mixture of such materials may be used.

Examples of a mono-functional monomer are carboxylic acids (such as acrylic acid), hydroxyl monomers (2-hydroxyethyl acrylate, 2-hydroxypropyl acrylate, and 4-hydroxybutyl acrylate), alkyl, alicyclic monomers (isobutyl acrylate, t-butyl acrylate, isooctyl acrylate, lauryl acrylate, stearyl acrylate, isobornyl acrylate, and cyclohexyl acrylate), other functional monomers (2-methoxyethyl acrylate, methoxy ethylene glycol acrylate, 2-ethoxyethoxy ethyl acrylate, tetrahydrofurfuryl acrylate, benzyl acrylate, ethyl carbitol acrylate, phenoxyethyl acrylate, N,N-dimethylaminoethyl acrylate, N,N-dimethylamino propyl acrylamide, N,N-dimethylacrylamide, acryloyl morpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenyl acrylate, 2,4,6-tribromophenyl methacrylate, 2-(2,4,6-tribromophenoxy) ethyl acrylate, and 2-ethylhexyl acrylate.

Examples of a di-functional monomer are tri(propylene glycol) diacrylate, trimethylolpropane diallyl ether, and urethane acrylate.

Examples of a poly-functional monomer are trimethylolpropane triacrylate, dipentaerythritol pentaacrylate, dipentaerythritol hexaacrylate, and ditrimethylolpropane tetraacrylate.

Examples of an initiator are 2,2-dimethoxy-1,2-diphenylethane-1-one, 1-hydroxycyclohexyl phenyl ketone, and 2-hydroxy-2-methyl-1-phenylpropan-1-one.

As filler, either of inorganic fine particles or organic fine particles may be used. As inorganic particles, fine particles containing a metal oxide may be used. As a metal oxide, at least one oxide selected from a group consisting of silicon oxide ($SiO_2$), titanium oxide ($TiO_2$), zirconium oxide ($ZrO_2$), tin oxide ($SnO_2$), and aluminum oxide ($Al_2O_3$) may be used.

Examples of a functional additive are a levelling agent, a surface modifier, and an anti-foaming agent. Examples of a material of the base member 12 are a methyl methacrylate (co)polymer, polycarbonate, a styrene (co)polymer, a (co)polymer of methyl methacrylate and styrene, cellulose diacetate, cellulose triacetate, cellulose acetate butyrate, polyester, polyamide, polyimide, polyethersulfone, polysulfone, polypropylene, polymethylpentene, polyvinyl chloride, polyvinyl acetal, polyetherketone, polyurethane, and glass.

A molding method for the base member 12 is not particularly restricted, and any one of injection molding, extrusion molding, and cast molding may be used. If necessary, surface treatment, such as corona treatment, may be performed on the surface of the base member 12.

In terms of an improvement in the releasability of the replica master 11, a release agent, such as a silicone release agent or a fluorine release agent, is preferably applied to the surface of the replica master 11. Alternatively, an additive, such as a fluorine additive or a silicone additive, is preferably added to the transfer material 27.

Figure 13B:
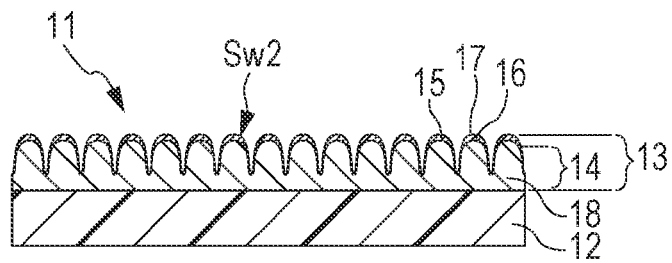
Figure 13C:
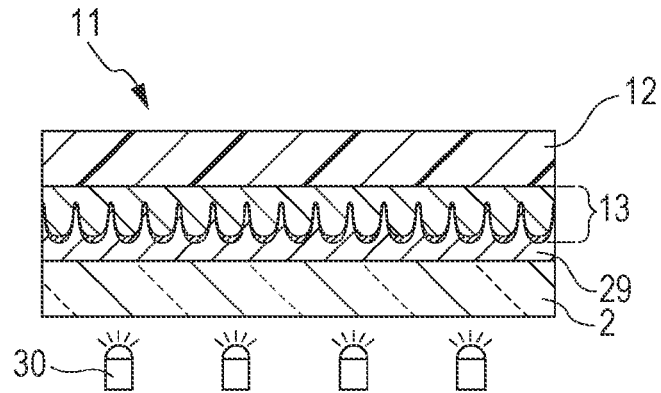

Then, as shown in FIG. 13B, the surface layer 15 is formed on the wave surface Sw1 of the base shape layer 14, thereby adjusting the profile of the wave surface Sw1 of the base shape layer 14. The adjusted wave surface serves as the wave surface Sw2. As a formation method of the surface layer 15, sputtering is preferably used. As a result of performing the above-described steps, the replica master 11 is formed.

(Optical Unit Forming Step)

Figure 13D:
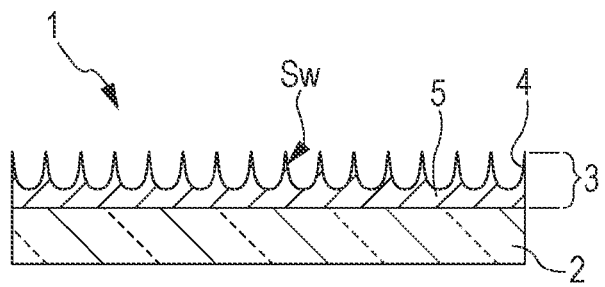

Then, as shown in FIG. 13D, the replica master 11 and a transfer material 29 applied to the surface of the base member 2 are brought into close contact with each other, and also, energy radiation, such as UV radiation, is applied to the transfer material 29 from an energy radiation source 30, thereby curing the transfer material 29. Then, the base member 2 integrated with the cured transfer material 29 is released from the molding surface of the replica master 11. Then, as shown in FIG. 13D, the shape layer 3 including the plurality of pits 4 is formed on the surface of the base member 2. In this case, if necessary, the intermediate layer 5 may be formed between the pits 4 and the base member 2. As a result of performing the above-described steps, the optical unit 1 is formed.

[Advantages]

According to the first embodiment, the inflection point Pi of the area S obtained by cutting through the wave surface Sw in a plane perpendicular to the vibration direction of the wave surface Sw is positioned toward the bottom Pb of the wave surface Sw from the center of the vibration of the wave surface Sw. Accordingly, even if the wave surface Sw has a curved plane which curves in a recessed shape between the apex Pt and the bottom Pb, high antireflection characteristics can be obtained.

In the first embodiment, an antireflection effect is obtained by providing the wave surface Sw on the surface of the optical unit 1. Accordingly, it is possible to obtain an antireflection effect by using a technique different from the formation of a multilayered film.

Hitherto, a photolithography technique and an etching technique are used as a formation method for a roll master. In these techniques, however, it is difficult to adjust the profile of a wave surface, which is a molding surface of a roll master. Thus, it is difficult to increase the antireflection wavelength range. In the first embodiment, however, the replica master 11 is formed by using the roll master 21 which is formed according to a photolithography technique and an etching technique, and the surface layer 15 is formed on the wave surface (molding surface) Sw1 of this replica master 11 by utilizing the characteristics of thin-film selective growth. Accordingly, the profile of the wave surface Sw1 of the replica master 11 can be adjusted, and the adjusted wave surface serves as the wave surface Sw2. That is, the position of the inflection point Pi of the area S of a cross section of the wave surface Sw of the replica master 11 can be adjusted. As a result, the antireflection wavelength range can be increased.

The average reflectance of an antireflection (AR) film formed by a multilayer stacking technique of the related art with respect to a wavelength of 380 to 780 nm is about 3%. The average reflectance of a wave surface formed by two-dimensionally arranging parabolic structures having a height of about 200 nm with respect to a wavelength of 380 to 780 nm is 0.4%. In contrast, in the first embodiment, by adjusting the thickness of the surface layer 15 of the replica master 11 to a predetermined range, the average reflectance of the wave surface Sw is 0.35% or lower.

MODIFIED EXAMPLES

First Modified Example

Figure 14A:
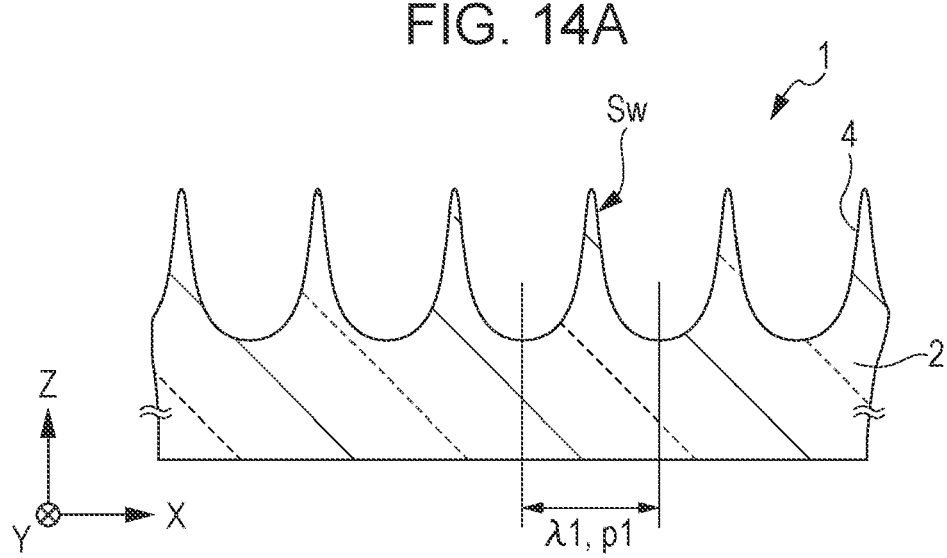
FIG. 14A is a sectional view illustrating an example of the configuration of an optical unit according to a first modified example.

FIG. 14A is a sectional view illustrating an example of the configuration of an optical unit 1 according to a first modified example. In the above-described first embodiment, the optical unit 1 includes the shape layer 3 and, if necessary, the baser member 2, and the wave surface Sw is provided on the shape layer 3. However, the wave surface Sw may be provided directly on the surface of the base member 2.

Figure 14B:
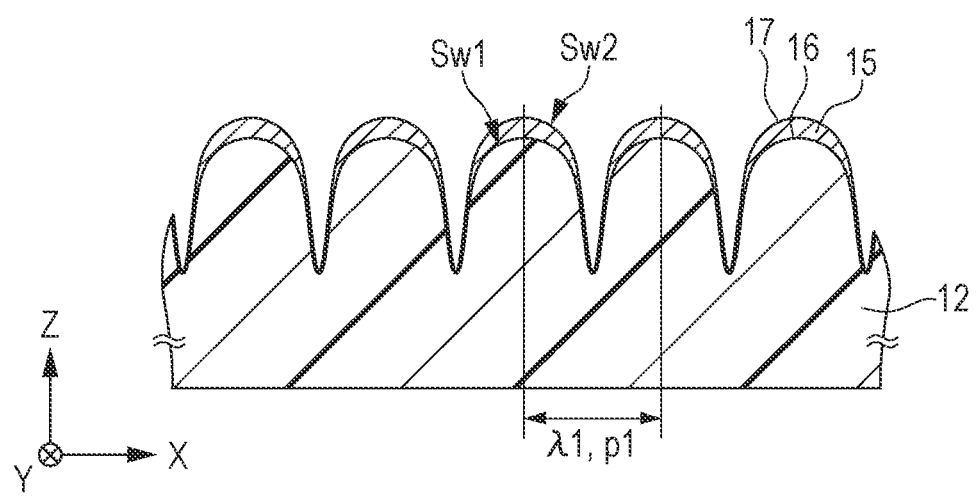
FIG. 14B is a sectional view illustrating an example of the configuration of a replica master according to a second modified example.

FIG. 14B is a sectional view illustrating an example of the configuration of a replica master 11 according to the first modified example. In the above-described first embodiment, the replica master 11 includes the base shape layer 14, the surface layer 15, and, if necessary, the baser member 12, and the wave surface Sw1 is provided on the base shape layer 14. However, the wave surface Sw1 may be provided directly on the surface of the base member 12. In this case, the base member 12 serves as the body of the replica master 11.

Second Modified Example

Figure 15:
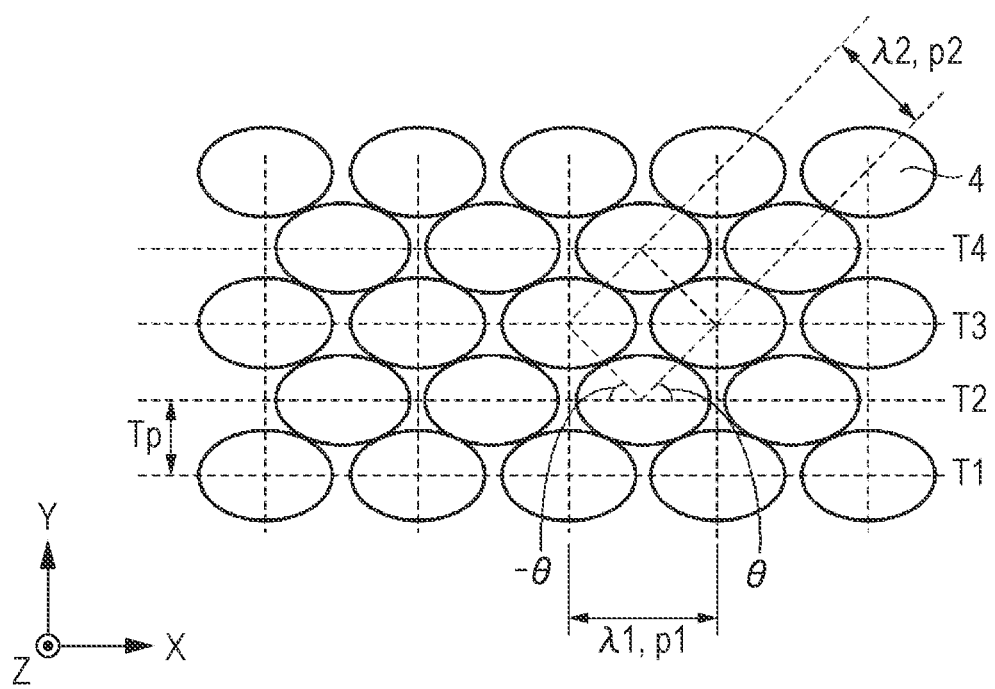
FIG. 15 is a plan view illustrating an example of the configuration of an optical unit according to the second modified example.

FIG. 15 is a plan view illustrating an example of the configuration of an optical unit 1 according to a second modified example. The optical unit 1 of the second modified example is different from that of the first embodiment in that a plurality of pits 4 are arranged such that they form a tetragonal lattice pattern or a quasi-tetragonal lattice pattern among adjacent three tracks T.

A tetragonal lattice is a lattice having the shape of a square. A quasi-tetragonal lattice is a lattice having the shape of a distorted square, unlike a lattice having the shape of a square. For example, if the pits 4 are linearly arranged, a quasi-tetragonal lattice is a tetragonal lattice distorted by extending a lattice having the shape of a square in a linear direction (track direction) of the arrangement of the pits 4. If the pits 4 are arranged in a meandering shape, a quasi-tetragonal lattice is a tetragonal lattice obtained by distorting a lattice having the shape of a square in accordance with a meandering arrangement of the pits 4 or a tetragonal lattice obtained by extending a lattice having the shape of a square in a linear direction (track direction) of the arrangement of the pits 4 and by distorting this lattice in accordance with a meandering arrangement of the pits 4.

If a tetragonal lattice is used as a pattern in the arrangement of the pits 4 of the optical unit 1, a tetragonal pattern or a quasi-tetragonal pattern is also used as a pattern in the arrangement of the surface structures 17 of the replica master 11 and that of the pits 22 of the roll master 21. The lattice pattern of the optical unit 1 is not restricted to the above-described hexagonal lattice pattern, quasi-hexagonal lattice pattern, tetragonal lattice pattern, or quasi-tetragonal lattice pattern, and another lattice pattern may be used.

Third Modified Example

In the above-described first embodiment, the wavelength λ of the wave surface Sw is equal to or shorter than the wavelength range of visible light. However, the range of the wavelength λ of the wave surface Sw is not restricted to that of visible light. It may be set to be a wavelength λ equal to or shorter than a wavelength range of light, the reflection of which is desired to be reduced. The wavelength range of light, the reflection of which is desired to be reduced, is, for example, that of UV radiation, visible light, or infrared radiation. The wavelength range of UV radiation is 10 to 360 nm, the wavelength range of visible light is 360 to 830 nm, and the wavelength range of infrared radiation is 830 nm to 1 mm.

Fourth Modified Example

In the above-described first embodiment, a radiation curing resin is used for forming the base shape layer 14 of the replica master 11 and the shape layer 3 of the optical unit 1. However, a thermosetting resin or a thermoplastic resin may be used for forming the base shape layer 14 of the replica master 11 and the shape layer 3 of the optical unit 1.

If a thermosetting resin is used for forming the base shape layer 14 of the replica master 11 and the shape layer 3 of the optical unit 1, shape transfer is performed in the following manner. The replica master 11 or the roll master 12 is pressed against a thermosetting resin, and the thermosetting resin is heated to a curing temperature by the replica master 11 or the roll master 12 and is cured, thereby transferring the shape of the molding surface of the replica master 11 or the roll master 12 to the thermosetting resin.

If a thermoplastic resin is used for forming the base shape layer 14 of the replica master 11 and the shape layer 3 of the optical unit 1, shape transfer is performed in the following manner. The replica master 11 or the roll master 12 is pressed against a thermoplastic resin so that they can be in close contact with each other. Then, the thermoplastic resin is heated to or around its glass transition point, or it is heated to higher than its glass transition point, and it is then cured, thereby transferring the shape of the molding surface of the replica master 11 or the roll master 12 to the thermoplastic resin.

The above-described replica master 11 includes a heat source, such as a heater, on the surface opposite to the molding surface, so that it can heat a thermosetting resin or a thermoplastic resin which is in close contact with the molding surface of the replica master 11. The roll master 21 contains therein a heat source, such as a heater, so that it can heat a thermosetting resin or a thermoplastic resin which is in close contact with the molding surface of the replica master 11.

2. Second Embodiment

[Configuration of Imaging Device]

Figure 16:
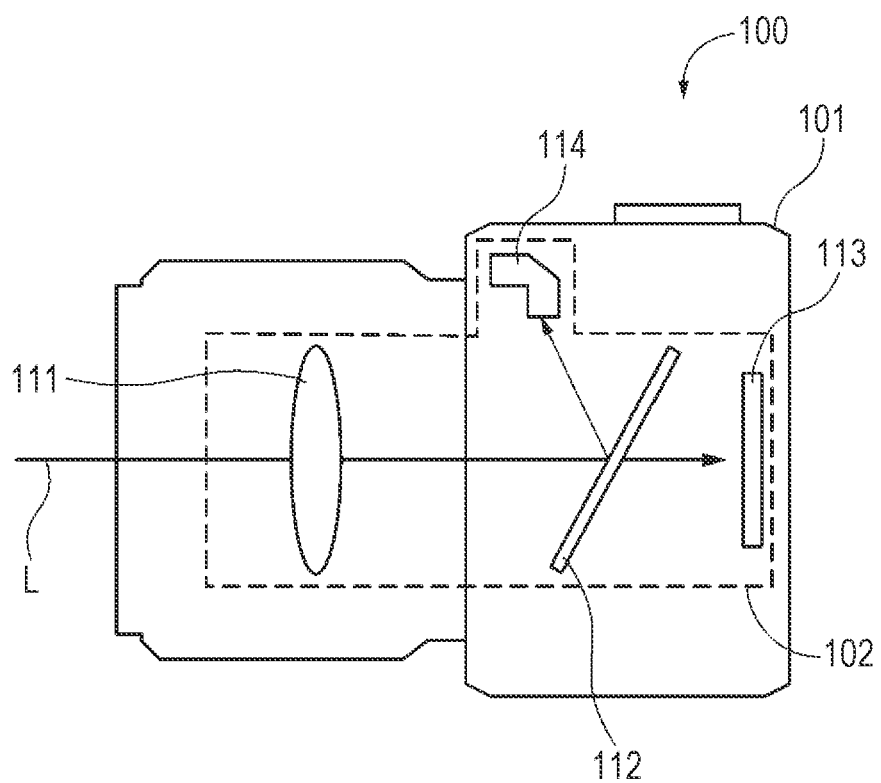
FIG. 16 is a schematic view illustrating an example of the configuration of an imaging device according to a second embodiment of the present technology.

FIG. 16 is a schematic view illustrating an example of the configuration of an imaging device (electronic apparatus) 100 according to a second embodiment of the present technology.

As shown in FIG. 16, the imaging device 100 of the second embodiment is a so-called digital camera (digital still camera), and includes a housing 101 and an imaging optical system 102 provided within the housing 101.

The imaging optical system 102 includes a lens 111, a transflective mirror 112, an imaging element 113, and an autofocus sensor 114. The imaging optical system 102 includes an optical unit having an antireflection function on the surface of at least one of these elements. As such an optical unit, the optical unit 1 of one of the first embodiment and the modified examples thereof is used. The surface on which the optical unit 1 is provided is at least one of an incidence plane that light L reflected by a subject strikes and an exit plane from which light L passing through the incidence plane exits. It is preferable, however, that the optical unit is provided on the incidence plane.

The lens 111 concentrates light L reflected by a subject toward the imaging element 113. The transflective mirror 112 reflects part of light L concentrated by the lens 111 toward the autofocus sensor 114, and transmits the remaining component of light L toward the imaging element 113. Upon receiving light L passing through the transflective mirror 112, the imaging element 113 converts the received light into an electric signal and outputs the electric signal to a signal processing circuit. Upon receiving light L reflected by the transflective mirror 112, the autofocus sensor 114 converts the received light into an electric signal and outputs the electric signal to a control circuit.

[Advantages]

According to the second embodiment, an optical unit having an antireflection function is provided on the surface of an element forming the imaging optical system 102, thereby making it possible to reduce the reflection of light on the surface of the element on which the optical unit is provided. It is thus possible to improve the efficiency in utilizing light L reflected by a subject.

3. Third Embodiment

In the above-described second embodiment, an example in which the present technology is applied to a digital camera (digital still camera) as an imaging device has been discussed. However, the application of the present technology is not restricted to this example. In a third embodiment, an example in which the present technology is applied to a digital video camera will be described below.

Figure 17:
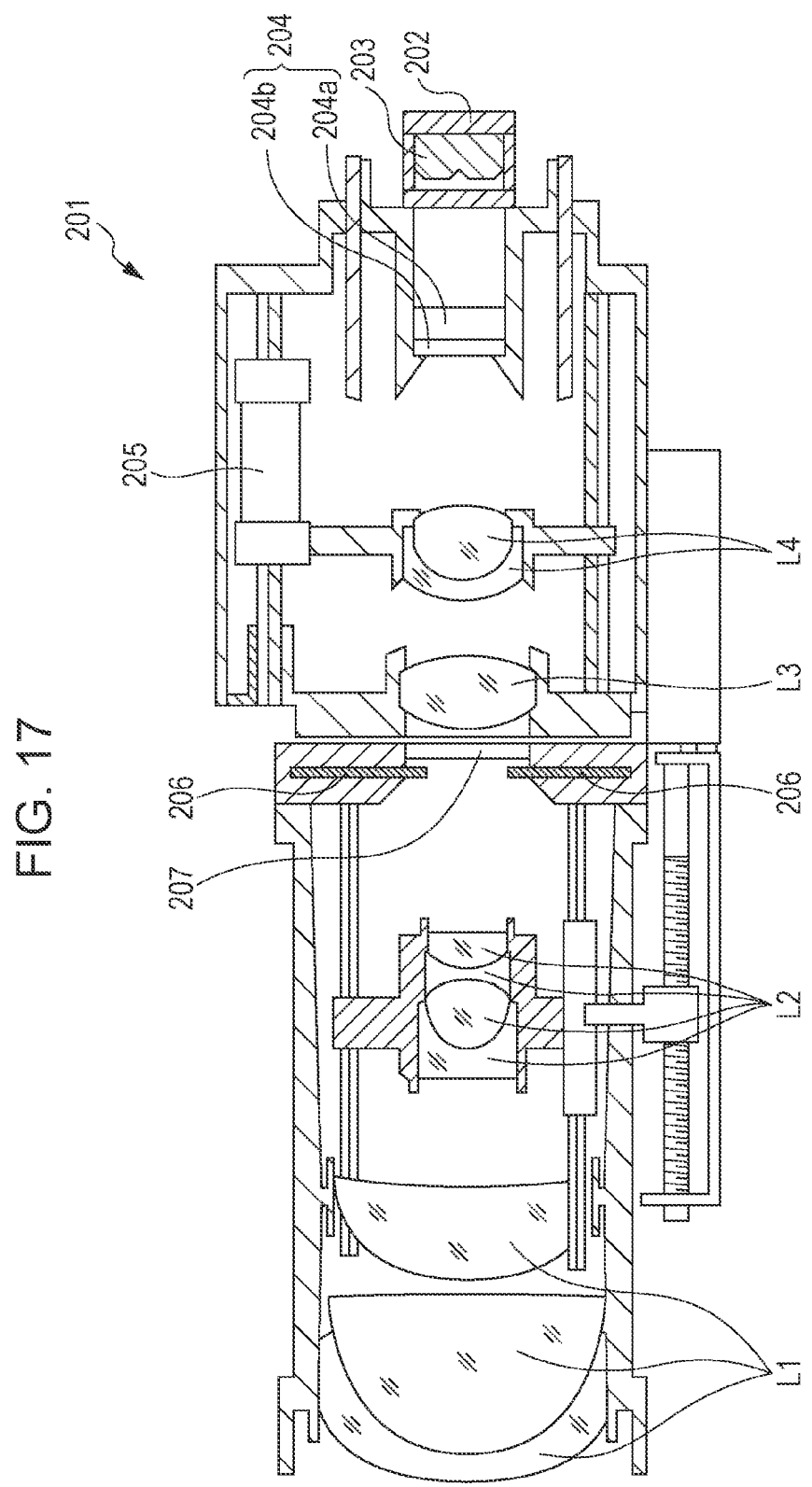
FIG. 17 is a schematic view illustrating an example of the configuration of an imaging device according to a third embodiment of the present technology.

FIG. 17 is a schematic view illustrating an example of the configuration of an imaging device 201 according to the third embodiment of the present technology.

As shown in FIG. 17, the imaging device (electronic apparatus) 201 of the third embodiment is a so-called digital video camera, and includes a first lens system L1, a second lens system L2, a third lens system L3, a fourth lens system L4, a solid-state imaging element 202, a low-pass filter 203, a filter 204, a motor 205, an iris diaphragm 206, and an electric dimmer element 207. In the imaging device 201, an imaging optical system is constituted by the first through fourth lens systems L1 through L4, the solid-state imaging element 202, the low-pass filter 203, the filter 204, the iris diaphragm 206, and the electric dimmer element 207.

The imaging optical system includes an optical unit having an antireflection function on the surface of at least one of the above-described elements. As such an optical unit, the optical unit 1 of one of the first embodiment and the modified examples thereof is used. The surface on which the optical unit 1 is provided is at least one of an incidence plane that light L reflected by a subject strikes and an exit plane from which light L passing through the incidence plane exits. It is preferable, however, that the optical unit is provided on the incidence plane.

The first and third lens systems L1 and L3 are fixed lenses. The second lens system L2 is a zoom lens. The fourth lens system L4 is a focus lens.

The solid-state imaging element 202 converts incident light into an electric signal and supplies the electric signal to a signal processor (not shown). The solid-state imaging element 202 is, for example, a charge coupled device (CCD).

The low-pass filter 203 is disposed, for example, at the front side of the solid-state imaging element 202. The low-pass filter 203 serves to suppress an aliasing signal (moire) generated in a case in which an image having a stripe pattern of a size similar to the pixel pitch is captured. The low-pass filter 203 is constituted by, for example, synthetic quartz.

The filter 204 blocks light in an infrared range from impinging on the solid-state imaging element 202 and also suppresses the elevation of a near-infrared spectrum (630 to 700 nm), thereby making the light intensity of a visible light range (400 to 700 nm) uniform. The filter 204 includes, for example, an infrared cut-off filter (hereinafter referred to as the "IR cut-off filter") 204a and an IR cut-off coating layer 204b. The IR cut-off coating layer 204b is formed by stacking an IR cut-off coating on the IR cut-off filter 204a. The IR cut-off coating layer 204b is formed on at least one of the surface of the IR cut-off filter 204a closer to a subject and the surface of the IR cut-off filter 204a closer to the solid-state imaging element 202. In FIG. 17, the IR cut-off coating layer 204b is formed on the surface of the IR cut-off filter 204a closer to a subject.

The motor 205 moves the fourth lens system L4 on the basis of a control signal supplied from a controller (not shown). The iris diaphragm 206 serves to adjust the amount of light to impinge on the solid-state imaging element 202, and is driven by a motor (not shown).

The electric dimmer element 207 serves to adjust the amount of light to impinge on the solid-state imaging element 202. The electric dimmer element 207 is an element constituted by a liquid crystal containing at least a dye colorant, for example, a dichroic guest-host (GH) liquid crystal.

[Advantages]

According to the third embodiment, advantages similar to those achieved by the second embodiment can be obtained.

4. Fourth Embodiment

Figure 18:
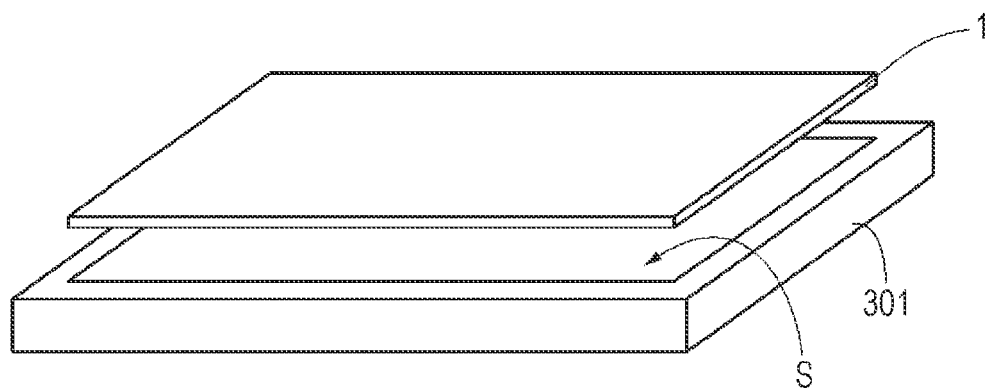
FIG. 18 is a perspective view illustrating an example of the configuration of a display device according to a fourth embodiment of the present technology.

FIG. 18 is a perspective view illustrating an example of the configuration of a display device 301 according to a fourth embodiment of the present technology. The optical unit 1 having an antireflection function is provided on a display surface S of the display device 301, which is an electronic apparatus. As such an optical unit, the optical unit 1 of one of the first embodiment and the modified examples thereof is used. If the optical unit 1 includes the base member 2, it is bonded to the display surface S of the display device 301 via, for example, an adhesion layer. If the optical unit 1 includes only the shape layer 3 without the base member 2, it may be directly formed on the display surface S of the display device 301.

As the display device 301, various display devices, such as a liquid crystal display (LCD), a cathode ray tube (CRT) display, a plasma display panel (PDP), an electroluminescence (EL) display, and a surface-conduction electron-emitter display (SED), may be used.

[Advantages]

According to the fourth embodiment, since the optical unit 1 is provided on the display surface S of the display device 301, the viewability of the display surface S of the display device 301 can be improved.

5. Fifth Embodiment

Figure 19A:
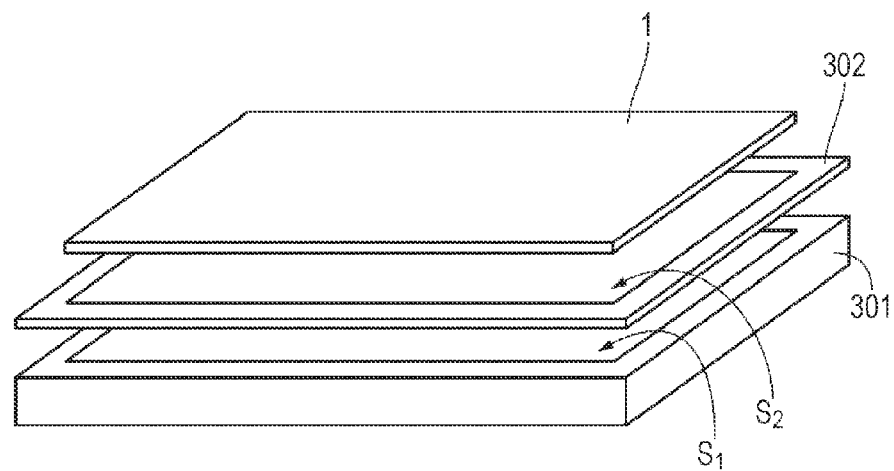
FIG. 19A is a perspective view illustrating an example of the configuration of a display device according to a fifth embodiment of the present technology.

FIG. 19A is a perspective view illustrating an example of the configuration of a display device 301 according to the fifth embodiment of the present technology. As shown in FIG. 19A, an input device 302 is provided on a display surface $S_1$ of the display device 301, which is an electronic apparatus. Then, an optical unit 1 having an antireflection function is provided on an input surface $S_2$ of the input device 302. As the optical unit 1, the optical unit 1 of one of the first embodiment and the modified examples thereof is used.

As the input device 302, a resistive touch panel or an electrostatic touch panel may be used. However, the touch panel is not restricted to these types. An example of a resistive touch panel is a matrix resistive touch panel. An example of an electrostatic touch panel is a projection electrostatic touch panel, such as a wire sensor touch panel and an ITO grid touch panel.

[Advantages]

According to the fifth embodiment, since the optical unit 1 is provided on the input surface $S_2$ of the input device 302, the viewability of the display device 301 including the input device 302 can be improved.

Modified Example

Figure 19B:
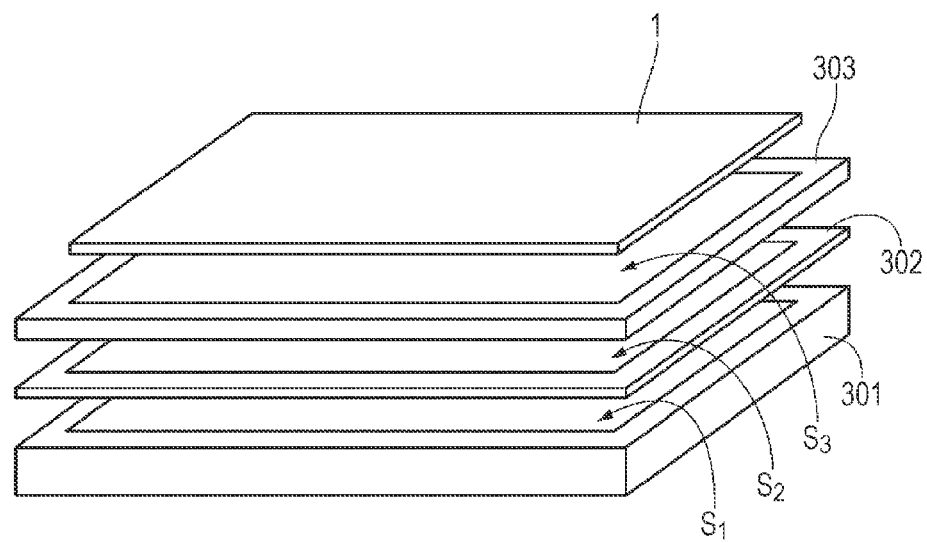
FIG. 19B is an exploded perspective view illustrating an example of the configuration of a display device according to a modified example.

FIG. 19B is an exploded perspective view illustrating an example of the configuration of a display device according to a modified example. As shown in FIG. 19B, a front panel (surface member) 303 may be further provided on the input surface $S_2$ of the input device 302. In this case, the optical unit 1 having an antireflection function is provided on a panel surface $S_3$ of the front panel 303. The input device 302 and the front panel 303 are bonded to each other by an adhesion layer made of, for example, an adhesive.

6. Sixth Embodiment

An electronic apparatus according to a sixth embodiment of the present technology includes the display device 301 of one of the fourth embodiment, the fifth embodiment, and the modified example thereof. As examples of the electronic apparatus according to the sixth embodiment, a television set, a notebook PC, a cellular phone, and a tablet computer will be discussed below. However, the electronic apparatus is not restricted to these devices, and the present technology is applicable to other electronic apparatuses.

Figure 20A:
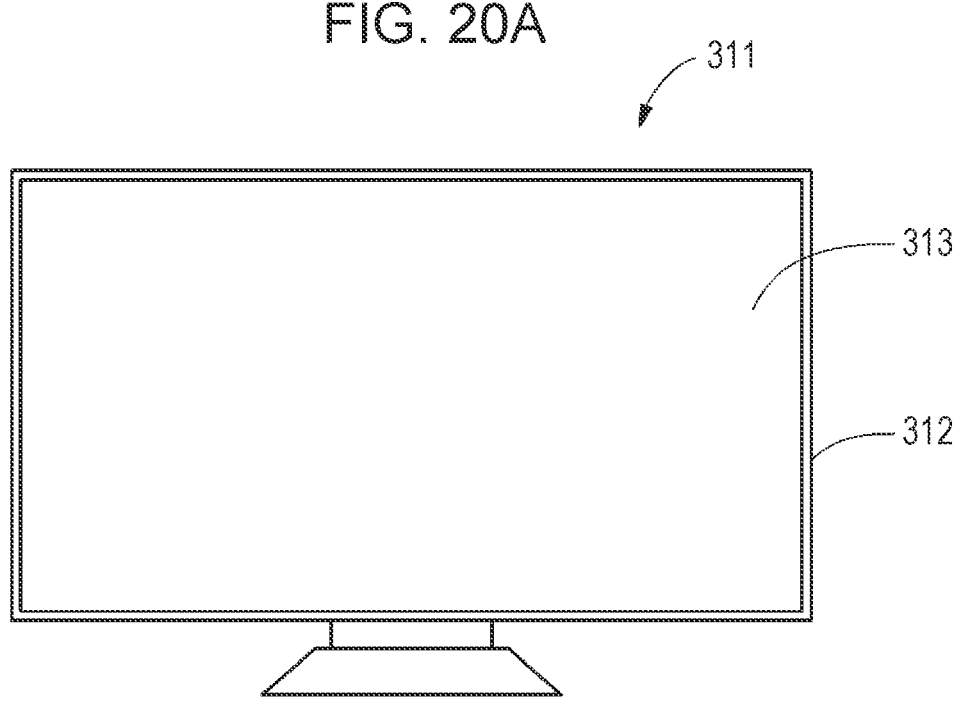
FIG. 20A is an external view illustrating an example of a television set according to a sixth embodiment of the present technology.

FIG. 20A is an external view illustrating an example of a television set 311. The television set 311 includes a housing 312 and a display device 313 contained within the housing 312. The display device 313 corresponds to the display device 301 of one of the fourth embodiment, the fifth embodiment, and the modified example thereof.

Figure 20B:
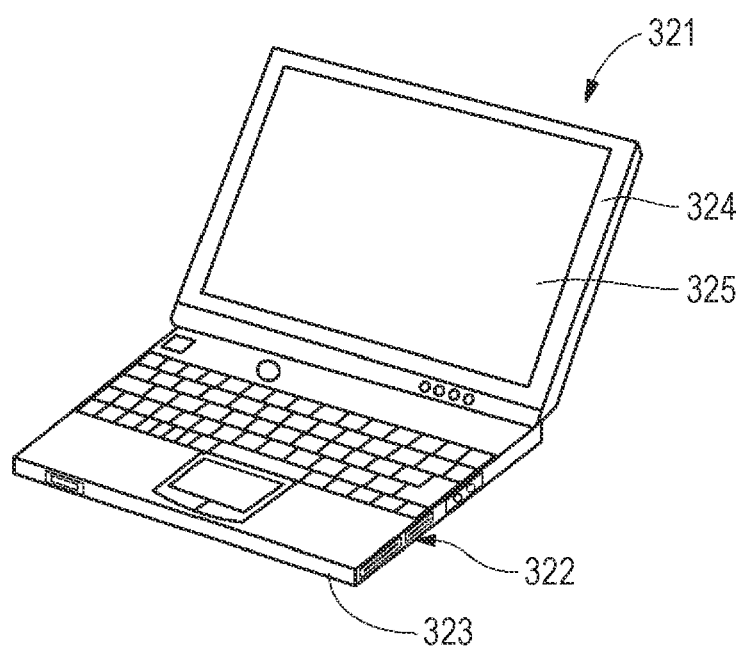
FIG. 20B is an external view illustrating an example of a notebook personal computer according to the sixth embodiment of the present technology.

FIG. 20B is an external view illustrating an example of a notebook PC 321. The notebook PC 321 includes a computer 322 and a display device 325. The computer 322 and the display device 325 are contained within housings 323 and 324, respectively. The display device 325 corresponds to the display device 301 of one of the fourth embodiment, the fifth embodiment, and the modified example thereof.

Figure 21A:
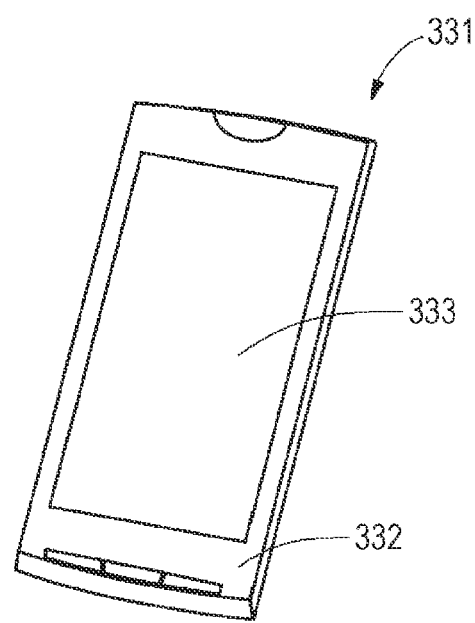
FIG. 21A is an external view illustrating an example of a cellular phone according to the sixth embodiment of the present technology.

FIG. 21A is an external view illustrating an example of a cellular phone 331. The cellular phone 331 is a so-called smartphone, and includes a housing 332 and a display device 333 contained within the housing 322. The display device 333 corresponds to the display device 301 of one of the fourth embodiment, the fifth embodiment, and the modified example thereof.

Figure 21B:
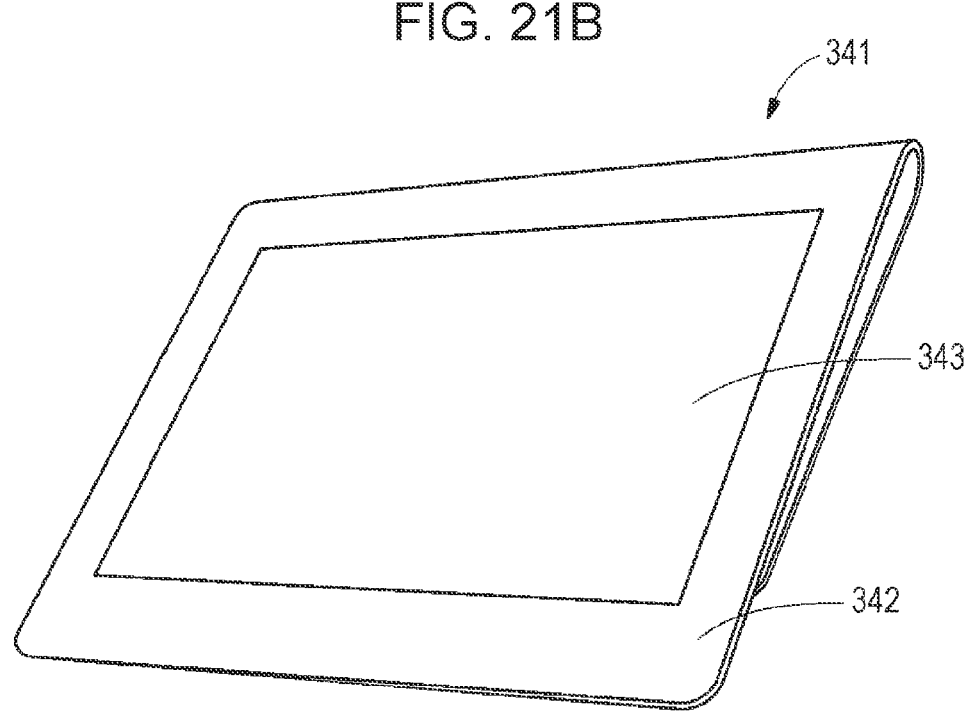
FIG. 21B is an external view illustrating an example of a tablet computer according to the sixth embodiment of the present technology.

FIG. 21B is an external view illustrating an example of a tablet computer 341. The tablet computer 341 includes a housing 342 and a display device 343 contained within the housing 342. The display device 343 corresponds to the display device 301 of one of the fourth embodiment, the fifth embodiment, and the modified example thereof.

[Advantages]

According to the sixth embodiment, since the electronic apparatuses each includes the optical unit 1 of one of the fourth embodiment, the fifth embodiment, and the modified example thereof, the viewability of the display surfaces of the electronic apparatuses can be improved.

EXAMPLES

The present technology will be specifically described below through illustration of examples. However, the present technology is not restricted to these examples.

(Height h and Pitch p of Structures)

In the present examples, the height h and the pitch p of structures of a replica master were determined as follows. First, a replica master was cut by including the apexes of structures, and an obtained cross section was photographed by a transmission electron microscope (TEM). Then, the height h and the pitch p of the structures of the replica master were determined from the TEM photograph.

(Thickness of Inorganic Layer (Surface Layer))

In the present examples, the thickness of an inorganic layer was determined as follows. First, a replica master was cut by including the apexes of structures, and an obtained cross section was photographed by a TEM. Then, the thickness of an inorganic layer at the apexes of the structures was determined from the TEM photograph.

Example 1-1

First, a glass roll master having an outer diameter of 126 mm was prepared. A resist layer was deposited on the surface of this glass roll master in the following manner. A photoresist was diluted with ten parts of thinner, and the diluted resist with a thickness of about 70 nm was applied to the cylindrical surface of the glass roll master by dipping, thereby depositing the resist layer on the surface of the glass roll master. Then, the glass roll master, which serves as a recording medium, was fed to the roll master exposure device shown in FIG. 10, and the resist layer was exposed to light. As a result, a latent image having a spirally continuous pattern which forms a hexagonal lattice pattern among adjacent three tracks was formed on the resist layer.

More specifically, laser light having laser power of 0.50 mW/m, which would also expose the surface of the glass roll master to laser light, was applied to a region in which a hexagonal-lattice exposure pattern would be formed, thereby forming a hexagonal lattice exposure pattern having a recessed shape. The thickness of the resist layer in the column direction perpendicular to the extending direction of the tracks was about 60 nm, while the thickness of the resist layer in the extending direction of the tracks was about 50 nm.

Then, a development process was performed on the resist layer on the glass roll master, so that the exposed portion of the resist layer would be dissolved. More specifically, the glass roll master which has not been developed was placed on a turntable of a developing machine (not shown), and a developer was dripped on the surface of the roll master while the turntable was being rotated, thereby developing the resist layer deposited on the surface of the roll master. As a result, a resist glass master having a resist layer which was opened in a hexagonal lattice pattern was obtained.

Then, by using a roll etching machine, plasma etching was performed in an atmosphere of a $CHF_3$ gas. Then, on the surface of the glass roll master, only the hexagonal lattice patterns exposed from the resist layer were etched, and the other portions were not etched by having the resist layer as a mask, thereby forming pits having an elliptical cone shape on the glass roll master. In this case, the amount (depth) of etching was adjusted in accordance with the etching time. Finally, the resist layer was completely removed by $O_2$ ashing, thereby obtaining a glass roll master having a hexagonal lattice pattern in a recessed shape. The depth of the recessed portions in the column direction was deeper than that in the extending direction of the tracks.

Then, the glass roll master was brought into close contact with a triacetyl cellulose (TAC) sheet coated with a UV curable resin. Then, UV radiation was applied to the UV curable resin so as to cure the resin, and the glass roll master was released. As a result, a plurality of structures (base structures) having a projecting shape were two-dimensionally formed as a hexagonal lattice pattern on the surface of the TAC sheet, thereby obtaining a replica master.

The configuration of the replica master is as follows:
shape of structures (shape of wave surface): paraboloid;
height h of structures (amplitude a of wave surface): 240 nm;
pitch p in the arrangement of structures (wavelength λ of wave surface): 130 nm; and
aspect ratio (h/p) of structures (ratio of wave surface (a/λ)):1.85.

Then, by sputtering, an $Nb_2O_3$ layer having a thickness of 15 nm was formed as an inorganic layer on the structures of the replica master, thereby adjusting the profile of the structures of the replica master. Then, the replica master having the adjusted profile was brought into close contact with a TAC sheet coated with a UV curable resin. UV radiation was applied to the UV curable resin to cure the resin, and the replica master was then released. As a result, an optical sheet was obtained.

Example 1-2

An optical sheet was formed in a manner similar to Example 1-1, except that the thickness of the inorganic layer was 30 nm.

Example 1-3

An optical sheet was formed in a manner similar to Example 1-1, except that the thickness of the inorganic layer was 50 nm.

Example 1-4

An optical sheet was formed in a manner similar to Example 1-1, except that the thickness of the inorganic layer was 75 nm.

Comparative Example 1

An optical sheet was formed in a manner similar to Example 1-1, except that a step of forming an inorganic layer was omitted.

Example 2-1

An optical sheet was formed in a manner similar to Example 1-1, except that the following structures (base structures) were formed on the surface of a replica master by adjusting the conditions of an exposure step and an etching step and that an ITO layer having a thickness of 15 nm was formed as an inorganic layer:

shape of structures (shape of wave surface): paraboloid;
height h of structures (amplitude a of wave surface): 200 nm;
pitch p in arrangement of structures (wavelength λ of wave surface): 250 nm; and
aspect ratio (h/p) of structures (ratio of wave surface (a/λ)):0.8.

Example 2-2

An optical sheet was formed in a manner similar to Example 2-1, except that the thickness of the inorganic layer was 30 nm.

Example 2-3

An optical sheet was formed in a manner similar to Example 2-1, except that the thickness of the inorganic layer was 50 nm.

Example 2-4

An optical sheet was formed in a manner similar to Example 2-1, except that the thickness of the inorganic layer was 75 nm.

Example 2-5

An optical sheet was formed in a manner similar to Example 2-1, except that the thickness of the inorganic layer was 100 nm.

Comparative Example 2

An optical sheet was formed in a manner similar to Example 2-1, except that a step of forming an inorganic layer was omitted.

Comparative Example 3

In a manner similar to Example 1-1, a replica master was formed by forming a plurality of structures (base structures) having a paraboloid on a surface. This replica master was used as an optical sheet. The profile adjustment was not made on this replica master.

Comparative Example 4

A high refractive index layer and a low refractive index layer were alternately stacked on the surface of a TAC sheet so as to form a four-layered film. As a result, an optical sheet having an antireflection layer constituted by the four-layered film on the surface was obtained.

(Evaluations of Spectral Reflection Characteristics)

The spectral reflection characteristics of the optical sheets formed as described above were evaluated in the following manner. Black tape was attached to the back side of each of the optical sheets on which a plurality of structures were formed. Then, light was applied to the optical sheet from the front side opposite to the back side to which black tape was attached, and reflection spectra (wavelength range of 380 to 780 nm) of the optical sheets were measured by using an evaluation machine (V-550) made by JASCO corporation. Then, the average reflectance (average rate of change) with respect to a wavelength range of 380 to 780 nm was found by using the obtained reflection spectra.

(Evaluation Results)

Figure 22:
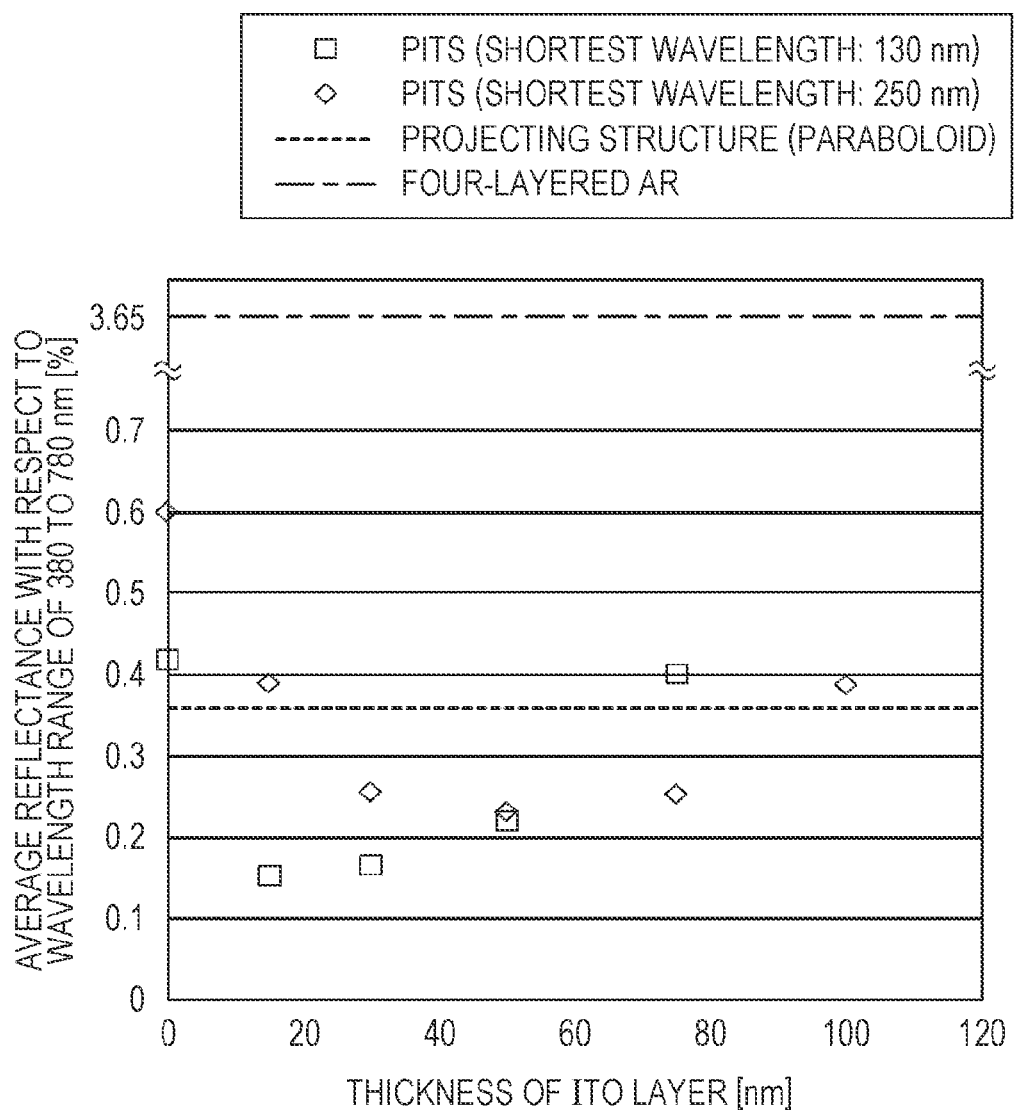
FIG. 22 illustrates the relationship between the thickness of an inorganic layer of each of replica masters and the average reflectance of each of optical sheets of Examples 1-1 through 1-4, 2-1 through 2-5, and Comparative Examples 1 and 2.

FIG. 22 illustrates the relationship between the thickness of the inorganic layer of each of the replica masters and the average reflectance of each of the optical sheets of Examples 1-1 through 1-4, 2-1 through 2-5, and Comparative Examples 1 and 2. In FIG. 22, the average reflectance of each of the optical sheets of Comparative Examples 3 and 4 is also shown for reference. FIG. 23 illustrates reflection spectra of each of the optical sheets of Examples 1-1 and 1-2, and Comparative Examples 3 and 4.

FIG. 22 shows the following features.

The average reflectance of an optical sheet formed by using a replica master to which profile adjustment is made by using an inorganic layer (surface layer) is lower than that of a replica master to which profile adjustment is not made. The reason for this may be as follows. By performing profile adjustment to the replica master by using an inorganic layer (surface layer), the inflection point Pi of the area S of a cross section of a wave surface has been shifted from a position closer to the apex point toward a position closer to the bottom point of the wave surface. The cross section of the wave surface is a cross section obtained by cutting through the wave surface of the optical sheet in a plane perpendicular to the vibration direction.

When the thickness of an inorganic layer of a wave surface having a wavelength of 250 nm is 30 nm or larger, higher antireflection characteristics are obtained for the wave surface having a wavelength of 250 nm than for a wave surface constituted by projecting structures. When the thickness of an inorganic layer of a wave surface having a wavelength of 130 nm is 10 nm, the inorganic layer becomes discontinuous and the antireflection effect is not exhibited.

When the thickness of an inorganic layer of the wave surface having a wavelength of 130 nm is 100 nm or larger, the antireflection effect is decreased. The reason for this may be that, due to the progress of the profile adjustment, the inflection point Pi of the area S of a cross section has been shifted again toward the apex point of the wave surface Sw from the center of the vibration.

FIG. 23 shows the following features.

Higher antireflection characteristics are obtained in the substantially entire visible light range (380 to 780 nm) for an optical sheet formed by using a replica master having a wavelength of 130 nm and an inorganic layer having a thickness of 15 nm than for an optical sheet having an antireflection layer constituted by a four-layered film and an optical sheet having a wave surface constituted by projecting structures.

Similarly, higher antireflection characteristics are also obtained in the substantially entire visible light range (380 to 780 nm) for an optical sheet formed by using a replica master having a wavelength of 250 nm and an inorganic layer having a thickness of 15 nm than for an optical sheet having an antireflection layer constituted by a four-layered film and an optical sheet having a wave surface constituted by projecting structures.

From the above-described features, it is seen that, in terms of an improvement in the antireflection characteristics, it is preferable that the inflection point Pi of the area S of a cross section obtained by cutting through a wave surface Sw constituted by a plurality of pits in a plane perpendicular to the vibration direction is positioned toward the bottom point of the wave surface Sw from the center of the vibration.

In order to allow the inflection point Pi to be positioned toward the bottom point of the wave surface Sw from the center of the vibration, it is preferable that a surface layer is formed by sputtering on a wave surface of a replica master constituted by projecting structures so as to make profile adjustment to the wave surface.

The embodiments of the present technology have been described specifically. However, the present technology is not restricted to the above-described embodiments, and various modifications may be made within the technical concept of the present technology.

For example, the configurations, methods, steps, shapes, materials, and numerical values discussed in the above-described embodiments are only examples, and if necessary, different configurations, methods, steps, shapes, materials, and numerical values may be used.

The configurations, methods, steps, shapes, materials, and numerical values discussed in the above-described embodiments may be combined without departing from the spirit of the present technology.

The present technology may employ the following configurations.

(1) An optical unit having an antireflection function, including: a wave surface having a wavelength equal to or shorter than a wavelength of visible light, the wave surface having a curved plane which curves in a recessed shape between an apex portion and a bottom portion of the wave surface, wherein an inflection point of an area of a cross section obtained by cutting through the wave surface in a plane perpendicular to a direction of vibration of the wave surface is positioned toward the bottom portion of the wave surface from a center of the vibration.

(2) The optical unit according to (1), wherein a volume va of the wave surface in a range from a maximum position of the vibration of the wave surface to a position by a distance of a/10 and a volume vb of the wave surface in a range from a minimum position of the vibration of the wave surface to a position by a distance of a/10 satisfy a relationship represented by va<vb, where a is an amplitude of the wave surface.

(3) The optical unit according to (2), wherein a ratio ((va/V)×100) of the volume va to a volume V of the wave surface in a range from the minimum position to the maximum position of the vibration of the wave surface is 10% or lower.

(4) The optical unit according to one of (1) to (3), wherein the wavelength and the amplitude of the wave surface are 130 nm or longer.

(5) The optical unit according to one of (1) to (4), wherein a shape of a cross section obtained by cutting through the wave surface in a plane parallel with the vibration direction of the wave surface has a gentle gradient from the apex portion toward the bottom portion.

(6) The optical unit according to one of (1) to (5), wherein the wave surface includes a plurality of pits disposed with pitches which are equal to or shorter than the wavelength of visible light.

(7) A mask including: a wave surface having a wavelength equal to or shorter than a wavelength of visible light, the wave surface having a curved plane which curves in a projecting shape between an apex portion and a bottom portion of the wave surface, wherein an inflection point of an area of a cross section obtained by cutting through the wave surface in a plane perpendicular to a direction of vibration of the wave surface is positioned toward the apex portion of the wave surface from a center of the vibration.

(8) The mask according to (7), further including: a body having a first wave surface; and a surface layer having a second wave surface disposed on the first wave surface, wherein the second wave surface has a wavelength equal to or shorter than the wavelength of visible light and is disposed such that a shape of the second wave surface resembles a shape of the first wave surface.

(9) The mask according to (8), wherein an amplitude of the second wave surface is longer than an amplitude of the first wave surface.

(10) The mask according to (8) or (9), wherein the surface layer includes an inorganic material.

(11) The mask according to (10), wherein the inorganic material includes a dielectric, a transparent conductor, a metal, or a semiconductor.

(12) The mask according to one of (7) to (11), wherein the body includes an organic material.

(13) The mask according to one of (8) to (12), wherein a thickness of the surface layer at a maximum position of the vibration of the wave surface is 10 nm or larger.

(14) The mask according to one of (7) to (13), wherein the wave surface includes a plurality of structures disposed with pitches which are equal to or shorter than the wavelength of visible light.

(15) An imaging device including: an optical system including an optical unit having an antireflection function, the optical unit including a wave surface having a wavelength equal to or shorter than a wavelength of visible light, the wave surface having a curved plane which curves in a recessed shape between an apex portion and a bottom portion of the wave surface, wherein an inflection point of an area of a cross section obtained by cutting through the wave surface in a plane perpendicular to a direction of vibration of the wave surface is positioned toward the bottom portion of the wave surface from a center of the vibration.

(16) An electronic apparatus including: a display device including an optical unit having an antireflection function, the optical unit including a wave surface having a wavelength equal to or shorter than a wavelength of visible light, the wave surface having a curved plane which curves in a recessed shape between an apex portion and a bottom portion of the wave surface, wherein an inflection point of an area of a cross section obtained by cutting through the wave surface in a plane perpendicular to a direction of vibration of the wave surface is positioned toward the bottom portion of the wave surface from a center of the vibration.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit, comprising:
 a wave surface that has a wavelength equal to or shorter than a wavelength of visible light,
 wherein the wave surface has a curved plane which curves in a recessed shape between an apex portion of the wave surface and a bottom portion of the wave surface, and
 wherein the wave surface includes a single inflection point of an area of a cross section through the wave surface in a plane perpendicular to a direction of an amplitude variation of the wave surface, wherein the single inflection point is positioned toward the bottom portion of the wave surface from a center of the amplitude variation,
 wherein a volume va of the wave surface in a first range from a maximum position of the amplitude variation of the wave surface to a first position separate from the maximum position by a distance of a/10, and a volume vb of the wave surface in a second range from a minimum position of the amplitude variation of the wave surface to a second position separate from the minimum position by a distance of a/10 satisfy a relationship va<vb, wherein a is an amplitude of the wave surface, wherein a ratio ((va/V)×100) of a volume va of the wave surface to a volume V of the wave surface is 10% or lower, wherein the volume V of the wave surface is in a third range from the minimum position of the amplitude variation of the wave surface to the maximum position of the amplitude variation of the wave surface.

2. The optical unit according to claim 1, wherein each of the wavelength of the wave surface and the amplitude of the wave surface are 130 nm or longer.

3. The optical unit according to claim 1, wherein a shape of a different cross section through the wave surface, in a plane parallel with the direction of the amplitude variation of the wave surface, has a gentle gradient from the apex portion toward the bottom portion.

4. The optical unit according to claim 1, wherein the wave surface includes a plurality of pits with pitches which are equal to or shorter than the wavelength of visible light.

5. A mask comprising:
a first wave surface that has a wavelength equal to or shorter than a wavelength of visible light,
wherein the first wave surface has a curved plane which curves in a projecting shape between an apex portion of the first wave surface and a bottom portion of the first wave surface, and
wherein the first wave surface includes a single inflection point of an area of a cross section through the first wave surface in a plane perpendicular to a direction of an amplitude variation of the first wave surface,
wherein the single inflection point is positioned toward the apex portion of the first wave surface from a center of the amplitude variation,
wherein a second wave surface on an optical unit is obtained based on a shape of the mask, wherein a volume va of the second wave surface in a first range from a maximum position of the amplitude variation of the second wave surface to a first position separate from the maximum position by a distance of a/10, and a volume vb of the second wave surface in a second range from a minimum position of the amplitude variation of the second wave surface to a second position separate from the minimum position by a distance of a/10 satisfy a relationship va<vb, wherein a is an amplitude of the second wave surface,
wherein a ratio ((va/V)×100) of a volume va of the second wave surface to a volume V of the second wave surface is 10% or lower, wherein the volume V of the second wave surface is in a third range from the minimum position of the amplitude variation of the second wave surface to the maximum position of the amplitude variation of the second wave surface.

6. The mask according to claim 5, further comprising:
a body that has a third wave surface; and
a surface layer that has a fourth wave surface, the fourth wave surface is on the third wave surface,
wherein the fourth wave surface has a wavelength equal to or shorter than the wavelength of visible light, and
wherein a shape of the fourth wave surface resembles a shape of the third wave surface.

7. The mask according to claim 6, wherein an amplitude of the fourth wave surface is longer than an amplitude of the third wave surface.

8. The mask according to claim 6, wherein the surface layer includes an inorganic material.

9. The mask according to claim 8, wherein the inorganic material includes at least one of a dielectric, a transparent conductor, a metal, or a semiconductor.

10. The mask according to claim 6, wherein the body includes an organic material.

11. The mask according to claim 6, wherein a thickness of the surface layer at the maximum position of the amplitude variation of the first wave surface is 10 nm or larger.

12. The mask according to claim 5, wherein the first wave surface includes a plurality of structures with pitches which are equal to or shorter than the wavelength of visible light.

13. An imaging device, comprising:
an optical system including an optical unit that has an antireflection function,
the optical unit including a wave surface that has a wavelength equal to or shorter than a wavelength of visible light,
wherein the wave surface has a curved plane which curves in a recessed shape between an apex portion of the wave surface and a bottom portion of the wave surface, and
wherein the wave surface includes a single inflection point of an area of a cross section through the wave surface in a plane perpendicular to a direction of an amplitude variation of the wave surface, wherein the single inflection point is positioned toward the bottom portion of the wave surface from a center of the amplitude variation,
wherein a volume va of the wave surface in a first range from a maximum position of the amplitude variation of the wave surface to a first position separate from the maximum position by a distance of a/10, and a volume vb of the wave surface in a second range from a minimum position of the amplitude variation of the wave surface to a second position separate from the minimum position by a distance of a/10 satisfy a relationship va<vb, wherein a is an amplitude of the wave surface,
wherein a ratio ((va/V)×100) of a volume va of the wave surface to a volume V of the wave surface is 10% or lower, wherein the volume V of the wave surface is in a third range from the minimum position of the amplitude variation of the wave surface to the maximum position of the amplitude variation of the wave surface.

14. An electronic apparatus, comprising:
a display device including an optical unit that has an antireflection function,
the optical unit including a wave surface that has a wavelength equal to or shorter than a wavelength of visible light,
wherein the wave surface has a curved plane which curves in a recessed shape between an apex portion of the wave surface and a bottom portion of the wave surface, and
wherein the wave surface includes a single inflection point of an area of a cross section through the wave surface in a plane perpendicular to a direction of an amplitude variation of the wave surface, wherein the single inflection point is positioned toward the bottom portion of the wave surface from a center of the amplitude variation,
wherein a volume va of the wave surface in a first range from a maximum position of the amplitude variation of the wave surface to a first position separate from the maximum position by a distance of a/10, and a volume vb of the wave surface in a second range from a minimum position of the amplitude variation of the wave surface to a second position separate from the minimum position by a distance of a/10 satisfy a relationship va<vb, wherein a is an amplitude of the wave surface, wherein a ratio ((va/V)×100) of a volume va of the wave surface to a volume V of the wave surface is 10% or lower, wherein the volume V of the wave surface is in a third range from the minimum position of the amplitude variation of the wave surface to the maximum position of the amplitude variation of the wave surface.

\* \* \* \* \*